United States Patent
Ishii et al.

(10) Patent No.: US 6,298,015 B1
(45) Date of Patent: Oct. 2, 2001

(54) MAGNETO-OPTICAL REPRODUCING METHOD USING A MAGNIFIED MAGNETIC DOMAIN

(75) Inventors: Kazuyoshi Ishii, Tokyo; Masakuni Yamamoto, Yamato; Koichiro Nishikawa, Takasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/323,995

(22) Filed: Jun. 2, 1999

(30) Foreign Application Priority Data

Jun. 3, 1998 (JP) .................................................. 10-154879
Jun. 4, 1998 (JP) .................................................. 10-156074

(51) Int. Cl.$^7$ ..................................................... G11B 11/00
(52) U.S. Cl. ............................................................. 369/13
(58) Field of Search ................................ 369/13, 14, 110, 369/116; 300/59, 114; 428/694 ML, 64.3, 694 MT, 694 RE

(56) References Cited

U.S. PATENT DOCUMENTS

| | | | |
|---|---|---|---|
| 5,199,023 | 3/1993 | Yamamoto et al. | 369/275.4 |
| 5,233,578 | 8/1993 | Yamamoto et al. | 369/13 |
| 5,329,517 | 7/1994 | Yamaguchi et al. | 369/110 |
| 5,428,586 | 6/1995 | Kobayashi et al. | 369/13 |
| 5,555,231 | 9/1996 | Yamamoto | 369/100 |
| 5,557,601 | 9/1996 | Nishikawa | 369/121 |
| 5,768,219 | 6/1998 | Yamamoto et al. | 369/13 |
| 5,786,117 | 7/1998 | Hishi et al. | 430/21 |
| 5,936,915 * | 8/1999 | Fujii et al. | 369/13 |
| 5,956,296 | 9/1999 | Yamamoto et al. | 369/13 |
| 5,956,297 | 9/1999 | Yamamoto | 369/13 |
| 5,995,472 | 11/1999 | Fujii et al. | 369/10 |
| 6,058,077 * | 5/2000 | Miyaoka | 369/13 |
| 6,069,852 * | 5/2000 | Miyaoka et al. | 369/13 |
| 6,084,830 * | 7/2000 | Ashinuma et al. | 369/13 |
| 6,104,676 * | 8/2000 | Yamamoto | 369/13 |

FOREIGN PATENT DOCUMENTS 6-290496   10/1994   (JP) .

OTHER PUBLICATIONS

K. Takahashi, et al., "Magnetic Expansion Of The Cad Disk With A TM–Rich GDFE Layer," Joint MORIS/ISOM, Tu–E–05, pp. 40–41 (Oct. 1997).

* cited by examiner

Primary Examiner—Tan Dinh
(74) Attorney, Agent, or Firm—Fitzpatrick, Cella, Harper & Scinto

(57) ABSTRACT

A method for reproducing information from a magneto-optical medium which includes a memory layer composed of magnetic film and a displacement layer composed of a magnetic film laminated with the memory layer is provided. Information signals are recorded on magnetized areas arranged in a predetermined direction on the memory layer. Domain walls having arc shapes curved in the same direction are formed on borders of the magnetized areas. The method includes the steps of: forming a high temperature area having shape of a circle or an elongated circle in the medium by scanning an array of the magnetized areas on the memory layer with a light spot in a direction toward convexities of the arc shapes of the magnetized areas; transferring one of the magnetized areas together with a domain wall to the displacement layer when a front end of the high temperature area reaches a domain wall at a front end of one of the magnetized areas in the memory layer in accordance with the scanning with the light spot; displacing the domain wall of the magnetized area transferred to the displacement layer toward a center of the high temperature area to magnify the magnetized area; and reproducing information by detecting reflected rays of the light spot in a condition where the magnetized area transferred to the displacement layer is magnified.

8 Claims, 22 Drawing Sheets

MAGNETO-OPTICAL REPRODUCING METHOD USING A MAGNIFIED MAGNETIC DOMAIN

BACKGROUND OF THE INVENTION

1. Field of the Invention

The present invention relates to an information reproducing method and an information recorder/reproducer.

2. Related Background Art

There have conventionally been proposed a variety of reproducing methods which reproduce information signals by detecting magnetized areas from magneto-optical media on which information signals are recorded at high densities by forming the magnetized areas. A reproducing method which was proposed by Koyata Takahashi et al. in Joint MORIS/ISOM '97, Tu-E-05 in particular is characterized in that it transfers a magnetized area formed on a memory layer to a transfer region formed on a displacement layer and detects the transferred magnetized area in a magnified condition. A reproducing method of this kind has thereafter been referred to as magnetic domain magnifying reproduction. It has been reported that the magnetic domain magnifying reproduction was capable of detecting a magnetized area formed on the memory layer even when it was smaller than a light spot of a reproducing light beam.

Description will be made below of the conventionally proposed magnetic domain magnifying reproduction. FIGS. 1A and 1B are partially enlarged diagrams of a magneto-optical medium 10 which is used for the magnetic domain magnifying reproduction. FIG. 1A is a top view, whereas FIG. 1B is a sectional view. The magneto-optical medium 10 consists of a substrate (not shown) and a magnetic layer 11 disposed on a surface of the substrate. The magnetic layer 11 is composed of three layers made of magnetic materials, that is, a memory layer 14 made of TbFeCo, a switching layer 13 made of GdFe and a displacement layer 12 made of GdFeCo. The memory layer 14 is a perpendicular magnetization film, whereas the switching layer 13 is an internal magnetization film at a temperature lower than T3 but a perpendicular magnetization film at a temperature higher than T3 and has a Curie temperature of T4. Furthermore, displacement layer 12 is an internal magnetization film at a temperature not exceeding T3 but a perpendicular magnetization film at a temperature higher than T3 and assumed to have a Curie temperature higher than T4. In the memory layer 14, circular magnetized areas R1, R2, R3, . . . having a diameter of 0.5 μm which are magnetized downward as shown in FIG. 1B and enclosed by domain walls Q1, Q2, Q3, . . . , are formed in a row as well as surroundings thereof which are magnetized upward. These circular magnetized areas R1, R2, R3, . . . are formed by a recording method which displaces the magneto-optical medium 10 relative to a recording light beam while irradiating the magnetic layer 11 with a recording light beam which has an intensity modulated by information signals to be recorded and is condensed into a fine spot, and simultaneously applying a magnetic field to a location irradiated with the recording light beam in a definite direction (light modulation recording method).

Then, a principle of the magnetic domain magnifying reproduction will be described with reference to FIGS. 2A through 2D. Description will be made taking as an example a case where a magnetized area is detected from the magneto-optical medium 10 shown in FIGS. 1A and 1B by the magnetic domain magnifying reproduction. To detect the magnetized area, the magneto-optical medium 10 is first displaced relative to a reproducing light beam while irradiating the magnetic layer 11 of the magneto-optical medium 10 with the reproducing light beam. FIGS. 2A through 2D sequentially shows status changes which occur in the magnetic layer 11 as time elapses. An arrow A in the drawing indicates a displacement direction of the magneto-optical medium 10.

When the magnetic layer 11 is irradiated with the reproducing light beam as described above, it is partially heated, thereby forming an isothermal line indicating the temperature T3 and another isothermal line indicating the temperature T4 which are represented by numerals 15 and 16 respectively in FIGS. 2A through 2D. In a region outside the isothermal line 15 of the displacement layer 12 wherein temperature is lower than T3, the switching layer 13 and the displacement layer 12 are the internal magnetization films. In a transfer region 17 which is line 15 of the displacement layer 12 wherein temperature is higher than T3, the displacement layer 12 is the perpendicular magnetization film. Furthermore, switching layer 13 is the perpendicular magnetization film in a region between the isothermal line 15 and the isothermal line 16 where temperature is higher than T3 and lower than T4, but demagnetized in a region enclosed by the isothermal line 16 where the temperature is higher than T4. Both the displacement layer 12 and the switching layer 13 are subjected to exchange coupling with the memory layer 14 in the region between the isothermal line 15 and the isothermal line 16 where both the layers 12 and 13 are the perpendicular magnetization films, whereas the displacement layer 12 is not subjected to exchange coupling with the memory layer 14 in the region enclosed by the isothermal line 16 where the switching layer 13 is demagnetized.

In the status shown in FIG. 2A first, the magnetized areas R1, R2, R3, . . . which are formed on the memory layer 14 are not located right under a transfer region formed on the displacement layer 12 and the memory layer 14 located right under a transfer region 17 is magnetized upward. As a result of exchange coupling with the memory layer 14, the magnetization of the memory layer 14 is transferred to the transfer region 17, thereby magnetizing it upward. In addition, an area of the transfer region 17 which is enclosed by the isothermal line 16 is not subjected to exchange coupling with the memory layer 14, but follows the upward magnetization which is transferred and formed to and in the transfer region 17 due to exchange coupling of surroundings thereof since no cause for downward magnetization is constituted. When the magneto-optical medium 10 displaces with a time lapse, a portion of the magnetized area R2 formed on the memory layer 14 is partially located right under the transfer region 17, as shown in FIG. 2B. At this time, the portion of the magnetized area R2 which is located right under the transfer region 17 is transferred to the transfer region 17 due to exchange coupling, thereby forming a magnetized area Re2 which is magnetized downward and enclosed by a domain wall Qe2.

When the magneto-optical medium 10 displaces with a further time lapse, a portion of the magnetized area Re2 which is transferred and formed to and on the transfer region 17 enters the region enclosed by the isothermal line 16 from the front (left side in the drawing) of the isothermal line 16 as shown in FIG. 2C. At this stage, driving forces directed toward a higher temperature, i.e., toward a center of the transfer region 17, are exerted to portions of the domain wall Qe2 as indicated by arrows D. The domain wall Qe2 is restrained in the region between the isothermal line 15 and the isothermal line 16 where the displacement layer 12 is in exchange coupling with the memory layer 14, whereas the domain wall Qe2 is liable to be displaced by actions of the driving forces in the region enclosed by the isothermal line 16 where the displacement layer 12 is not in exchange coupling with the memory layer 14. When energy is imparted by applying a magnetic field having an adequate magnitude (for example, −110 [Oe]) in a direction corresponding to a magnetization direction of the magnetized area Re2 which is transferred and formed, the domain wall Qe2 can be prolonged and the magnetized area Re2 is magnified within the region enclosed by the isothermal line 16 as shown in FIG. 2D.

When the magneto-optical medium 10 displaces with a further time lapse and the magnetized area R2 formed on the memory layer 14 goes from the rear (right side in the drawing) of the isothermal line 16 completely to the outside of the isothermal line 16, the magnetized area Re2 magnified in the transfer region 17 is contracted and disappeared, thereby resuming a condition similar to that shown in FIG. 2A. The magnetized area which is transferred and formed to and on the transfer region 17 is magnified each time the magnetized areas R1, R2, R3, . . . formed on the memory layer 14 are displaced sequentially to the isothermal line 16 by repeating the operations shown in FIGS. 2A through 2D. The magnified magnetized area can be detected with a reflected light of the reproducing light beam by utilizing a magneto-optical effect. The magnetic domain magnifying reproduction described above makes it possible to detect the magnetized area formed on the memory layer 14 by transferring and magnifying the magnetized area to the transfer region of the displacement layer 12 even when the magnetized area is smaller than the light spot of the reproducing light beam.

For the conventional magnetic domain magnifying reproduction described above, the domain wall must be prolonged to magnify the magnetized area transferred and formed to and on the transfer region 17 and it is necessary for this purpose to impart a large energy to the domain wall. Furthermore, it is necessary to exert the driving forces in directions nearly perpendicular to the portions of the domain wall within the region enclosed by the isothermal line 16 to magnify the magnetized area, however the driving forces exerted to the domain wall are actually in directions which are in parallel with the domain wall more accurately at locations which are closer to the isothermal line 16 on the domain wall as indicated by arrows D in FIG. 2C. It is therefore impossible to displace the portions of the domain wall close to the isothermal line 16 along the isothermal line 16 only with driving forces obtained with a temperature gradient. For this reason, it is impossible to magnify the magnetized area in the transfer region 17 enclosed by the isothermal line 16 only by heating the magnetic layer 11 with heat generated by the irradiation with the reproducing light beam and a magnetic field having an adequate magnitude must be applied in the direction corresponding to the magnetization direction of the magnetized area.

However, such a method cannot magnify a magnetized area when a rear end (left side in FIGS. 2A through 2D) of the magnetized area passes the front end of the isothermal line 16 though it detects the magnetized area in a magnified condition when a front end (right side in FIGS. 2A through 2D) of a magnified area having a definite magnetization direction (for example, downward in the example described above) passes a front end (left side in FIGS. 2A through 2D) of the isothermal line 16. Accordingly, it was impossible for recording digital signals consisting of '0' and '1' to apply the method to a mark edge recording mode which permits further enhancing a recording density by alternately forming magnetized areas having different magnetization directions, corresponding front ends and rear ends of magnetized areas having different lengths to '1', and corresponding other portions of the magnetized areas to '0' though the method is applicable to a mark position recording method which corresponds magnetized areas having a definite magnetization direction to '1' and corresponds areas between the magnetized areas to '0'. Even when the method is applied to the mark position recording mode, it is incapable of separately detecting a plurality of magnetized areas existing within the region enclosed by the isothermal line 16, thereby requiring forming the magnetized areas with sufficient intervals and being incapable of sufficiently enhancing a recording density.

Now, description will be made of a configuration of a conventional magneto-optical recorder/reproducer.

FIG. 3 is a diagram illustrating a conventional optical head which records/reproduces information on a magneto-optical medium (magneto-optical disk). In FIG. 3, a reference numeral 40 represents a semiconductor laser used as a light source. A diverging light bundle emitted from the semiconductor laser 40 is collimated by a collimator lens 41 and shaped by a beam shaping prism 42 into a parallel light bundle which has a circular sectional shape. It is assumed here that linearly polarized component which are perpendicular to each other as a P component and a S component, and that the parallel light bundle is a linearly polarized light bundle composed of the P component (in parallel with the paper surface). The light bundle composed of the P component is incident on a polarized light beam splitter 43. The polarized light beam splitter has characteristics, for example, of transmittance of 60% and reflectance of 40% for the P component, and transmittance of 0% and reflectance of 100% for the S component. The light bundle of the P component which has transmitted through the polarized light beam splitter 43 is condensed by an objective lens 44 to project a fine light spot to a magnetic layer of a magneto-optical disk 45. An external magnetic field is applied from a magnetic head 46 to a portion irradiated with the light spot to record a magnetic domain (mark) on the magnetic layer.

Reflected rays from the magneto-optical disk 45 are returned by way of the objective lens 44 to the polarized light beam splitter 43, which splits a portion of the reflected rays and leads it to a reproducing optical system. The reproducing optical system further splits the split light bundle with a polarized light beam splitter 47 which is prepared separately. The polarized light beam splitter 47 has characteristics, for example, of transmittance of 20% and a reflectance of 80% for the P component, and transmittance of 0% and reflectance of 100% for the S component. One of light bundles split by the polarized light beam splitter 47 is led by way of a condenser lens 53 to a half prism 54 and split into two light bundles, one of which is led by way of a knife edge 56 to a photodetector 57. Error signals for automatic tracking and automatic focusing light spots are generated by these control optical systems.

The other light bundle which is split by the polarized light beam splitter 47 is lead to a ½ wavelength filter 48 for turning a polarization direction of the light bundle 45 degrees, a condenser lens 49 for condensing the light bundle, a polarized light beam splitter 50, and photodetectors 51 and 52 which detects light bundles split by the polarized light beam splitter 50, thereby reproducing information. The polarized light beam splitter 50 has characteristics of transmittance of 100% and reflectance of 0% for the P component, and transmittance of 0% and reflectance of 100% for the S component. Signals detected with the photodetectors 51 and 52 are differentially detected with a differential amplifier (not shown) to generate reproduced signals.

Data is recorded on the conventional magneto-optical medium dependently on difference in perpendicular magnetization directions. When the magneto-optical medium on which the information is recorded dependently on difference in magnetization directions is irradiated with a linearly polarized light, a polarization direction of a reflected light is turned clockwise or counterclockwise dependently on the difference in magnetization directions. It is assumed, for example, that a linearly polarized rays incident on the magneto-optical medium are polarized in a direction of an axis P of a coordinates system as shown in FIG. 4, a reflected ray corresponding to downward magnetization is polarized in a direction R+ which is rotated +θk and a reflected ray corresponding to upward magnetization is polarized in a direction R− which is rotated −θk. When an analyzer is placed in a direction shown in FIG. 8, rays transmitting through the analyzer are A and B for R+ and R− respectively, whereby information can be obtained as a difference in light intensity by detecting the rays with photodetectors. In the example shown in FIG. 3, the polarized light beam splitter 50 functions as an analyzer at 45 degrees from the axis P for one of the split light bundles and at −45 degrees from the P axis for the other light split of bundles. In other words, signal components obtainable with the photodetectors 51 and 52 are in phase reverse to each other, whereby reproduced signals can be obtained with reduced noise by differential detection of individual signals.

On the other hand, there have been in the recent years enhanced demands for higher recording densities on magneto-optical media as described above. Line recording densities on optical disks such as magneto-optical media are generally dependent on laser wavelengths of reproducing optical systems and NAs (numerical apertures) of objective lenses. Speaking concretely, a limit of a reproducible magnetic domain lies on the order of $\lambda/2NA$ since a diameter of a light spot is determined once a laser wavelength $\lambda$ of a reproducing optical system and an NA of an objective lens are determined. To record information at a high density on the conventional optical disk, it is therefore necessary to shorten a laser wavelength of a reproducing optical system or enlarge an NA of an objective lens. However, improvements in laser wavelengths and NAs of objective lenses are also limited, and there have been developed techniques to enhance recording densities by contriving compositions of recording media and reading methods.

For example, the inventor has proposed in Japanese Patent Application Laid-Open No. 6-290496 a domain wall displacement reproducing method which transfers a magnetic domain recorded as a vertically magnetized domain on a memory layer to a displacement layer by projecting a light spot to a magneto-optical medium consisting of a plurality of laminated magnetic layers and magnifies the domain larger than the magnetic domain of the memory layer by displacing a domain wall of the magnetic domain transferred to the displacement layer, thereby reproducing information. This domain wall displacement reproducing method will be described with reference to FIGS. 5 through 8A and 8B. FIG. 5 is a diagram illustrating a configuration of a magneto-optical information recorder/reproducer which uses the domain wall displacement reproducing method.

In FIG. 5, a reference numeral 58 represents a magneto-optical recorder/reproducer which is connected to an information processor such as a computer (not shown) and an information recorder/reproducer such as a video camera. Disposed in the recorder reproducer 58 is a control circuit 59 which controls the recorder/reproducer as a whole. The control circuit 59 controls information transception byway of the external information processor and an interface controller 69, controls information recording and reproduction on a magneto-optical disk 61 by controlling internal components, and controls other operating components. A reference numeral 60 designates a spindle motor which rotates the magneto-optical disk 61 and is controlled by a spindle motor controller 68.

The magneto-optical disk 61 is configured to be set and removed into and out of the magneto-optical information recorder/reproducer 58 with a mechanism (not shown). A reference numeral 62 represents an optical head which optically records and reproduces information on the optical disk 61 and a reference numeral 63 designates a magnetic head which is located on a side opposite to the optical head 62 with regard to the magneto-optical disk 61 and applies a recording magnetic field for recording information. A reference numeral 64 denotes an optical head-magnetic head control circuit which controls a location of a light spot projected from the optical head 62 and a location of the magnetic head 63. This control circuit 64 performs automatic tracking control, seek control and automatic focusing control. A reference numeral 65 denotes an information recording circuit which records information and a reference numeral 67 represents an information reproducing circuit which reproduces information.

FIGS. 6A through 6D are schematic diagrams descriptive of a domain wall displacement reproduction type magneto-optical medium (the magneto-optical disk 61) used in the magneto-optical information recorder/reproducer shown in FIG. 5 as well as functions of the magneto-optical medium. FIG. 6A is a schematic sectional view of the magneto-optical medium and FIG. 6B is a schematic front view of the magneto-optical medium. The magneto-optical medium is composed of three magnetic layers 71, 72 and 73 which are a first magnetic layer (memory layer), a second magnetic layer (switching layer) and a third magnetic layer (displacement layer). A reference numeral 74 represents a light spot for reproduction and a reference numeral 75 designates an information track on the magneto-optical medium. Arrows in the layers indicate directions of atomic spins and domain walls 76 are formed between regions in which the directions of the atomic spins are reverse to each other. Used as the magneto-optical medium is a medium disclosed by Japanese Patent Application Laid-Open No. 6-290496 mentioned above.

FIG. 6C is a graph showing a temperature distribution formed in the magneto-optical medium. This temperature distribution is induced on the medium by a light beam (the light spot 74) projected for reproduction. Additional heating means (a heating light spot or the like) may be used to raise temperature of an area located before the light spot of the reproducing light beam and locate a peak of the temperature distribution after the light spot. It is assumed that a temperature of the second medium is Ts which is in the vicinity of a Curie temperature of the magnetic layer 72 at a position Xs.

FIG. 6D is a graph showing a distribution of domain wall energy density $\delta 1$ of the third magnetic layer 73 corresponding to the temperature distribution shown in FIG. 6C. When the domain wall energy density $\delta 1$ has a gradient in an X direction as shown in FIG. 6D, a force F1 shown in FIG. 6D is exerted to the domain wall of each layer which exists at a position X, functioning to displace the domain wall to a side on which a domain wall energy is lower. Since the third domain wall 73 has a low domain wall coercivity and a high degree of displacement of domain wall, its domain wall can be displaced easily and independently by the force F1. In an area which is before (on the right side in the drawing) the position Xs where the medium is set at a temperature lower than Ts, however, the domain wall in the third domain wall 73 is fixed at a position corresponding to the domain wall in the first domain wall 71 due to exchange coupling with the first domain wall which has a high domain wall coercivity.

When a domain wall 77 is located at the position Xs of the medium at this stage as shown in FIG. 6D, the medium is heated to the temperature Ts which is in the vicinity of the Curie temperature of the second magnetic layer 72, thereby breaking the exchange couplings of the second domain wall 72 with the first magnetic layer 71 and the second magnetic layer 73. As a result, the domain wall 77 of the third magnetic layer 73 momentarily displaces into an area where temperature is high and a domain wall energy density is low as indicated by an arrow. When the reproducing light spot 74 passes, all atomic spins are set in a direction in a magnetic layer 73 of the third magnetic layer which is located within the light spot. As the medium displaces, a domain wall 76 momentarily displaces and all the atomic spins are reversed and set in a same direction. As a result, signals reproduced by the light spot always have a definite amplitude independently of a size of a magnetic domain recorded on the first magnetic layer 71, thereby solving a problem of waveform interference due to an optical limit of diffraction. This method is capable of reproducing magnetic domains having sizes which are smaller than a limit of resolution on the order of $\lambda/2NA$ which is determined by a laser wavelength $\lambda$ and an NA of an objective lens.

FIG. 7 is a diagram exemplifying an optical head used in the recorder/reproducer shown in FIG. 5. Shown in FIG. 7 is a two-beam optical head which projects a reproducing light spot and a heating light spot. In FIG. 7, a reference numeral 79 represents a recording/reproducing semiconductor laser which has, for example, a wavelength of 780 nm. A reference numeral 80 designates a heating semiconductor laser which has, for example, a wavelength of 1.3 $\mu$m. Both the lasers are disposed so as to be incident on the recording medium as P component. Since laser beams emitted from semiconductor lasers generally have elliptic sectional shapes, it is conventional to obtain circular light spots on recording media using beam shaping prisms and nearly circular apertures.

Laser beams emitted from the semiconductor lasers 79 and 80 are shaped so as to have nearly circular sectional shapes by beam shaping means (not shown) and made into parallel light bundles by collimator lenses 81 and 82 respectively. A reference numeral 83 represents a dichroic mirror which is configured to allow a light bundle of 780 nm at 100% and reflects a light bundle of 1.3 $\lambda$m at 100% and a reference numeral 84 designates a polarized light beam splitter which transmits the P component at 70 to 80% and reflects S component which is perpendicular to the P component at approximately 100%. The parallel light bundles emerging from the collimator lenses 81 and 82 are incident on an objective lens 85 by way of the dichroic mirror 83 and the polarized light beam splitter 84.

The light bundle of 780 nm is configured to be larger than an aperture of the objective lens 85, whereas the light bundle of 1.3 $\mu$m is configured to be smaller than the aperture of the objective lens 85. Accordingly, an NA of the objective lens 85 serves less for the light bundle of 1.3 $\mu$m, whereby the light bundle of 1.3 $\mu$m forms a light spot larger than that of the light bundle of 780 nm on the recording medium 61. A reflected light bundle from the magneto-optical medium 61 is made again into a parallel light bundle by the objective lens 85, reflected by the polarized light beam splitter 84 and obtained as a light bundle 87. After wavelength separation by an optical system (not shown), servo error signals and information reproducing signals are obtained from the light bundle 87.

FIGS. 8A and 8B are diagrams descriptive of operations to perform the domain wall displacement reproduction using the optical head shown in FIG. 7. FIG. 8A shows a reproducing light spot and a heating light spot on the magneto-optical medium. In FIG. 8A, a reference numeral 88 represents a recording/reproducing light spot having a wavelength of 780 nm and a reference numeral 89 designates a heating light spot having a wavelength of 1.3 $\mu$m. A reference numeral 90 denotes domain walls of magnetic domains recorded at a land 91 and a reference numeral 92 represents a groove. Furthermore, a reference numeral 93 designates an area which is heated by the heating light spot 89. The recording/reproducing light spot 88 and the heating light spot 89 can be coupled with each other on the land 91 between the grooves 92 as shown in FIG. 8A. Accordingly, a temperature gradient can be formed on a displacing recording medium as shown in FIG. 8B. The temperature gradient and the recording/reproducing light spot 88 are in relationship which is shown in FIGS. 6A through 6D, thereby making it possible to displace domain walls.

The domain wall displacement reproduction adopts as a method to record information on a magneto-optical medium a magnetic field modulation method which permits enhancing a line density. Furthermore, the grooves 92 are demagnetized by annealing with a high temperature light spot to facilitate displacements of the domain walls. FIGS. 9A and 9B compare shapes of magnetic domains which are recorded by the magnetic field modulation method on a medium which is annealed with shapes of magnetic domains which are recorded by the magnetic field modulation method on a medium which is not annealed. FIG. 9A shows the magnetic domain recorded on the medium which is annealed, whereas FIG. 9B shows the magnetic domain recorded on the medium which is not annealed. In case of the magnetic domain shown in FIG. 9A, the grooves 92 are preliminarily annealed and demagnetized by the light spot at high temperature. A high temperature area 97 is formed when a light spot 94 is projected and magnetic domains 98 are formed in shapes like feathers of arrows when an external magnetic field modulated correspondingly to information to be recorded is applied from a magnetic head (not shown). FIG. 9B shows similar magnetic domains 102 which are formed in shapes like the feathers of arrows on the medium which is not annealed.

Comparing shapes of borders 99 and 100 between the magnetic domains 98 shown in FIG. 9A with shapes of borders 103 and 104 between the magnetic domains 102 shown in FIG. 9B, it will be understood that the borders 103 and 104 shown in FIG. 9B have shapes of feathers of arrows which have high curvature like a shape of the high temperature area 97, whereas the borders 99 and 100 have shapes which are nearly linear. It is considered that magnetic properties were destroyed stepwise in the vicinities of the grooves 92 by annealing, thereby making the domain walls to be displaced more easily and forming the linear shapes which are more stable.

Though description has been made above of the domain wall displacement reproduction method which uses the two-beam type optical head for easy understanding, it is actually desirable to reproduce information with a single-beam type optical head since the two-beam type optical head poses a problem of delicate adjustment and a problem of high operating cost. Description will be made of operations to reproduce the recording magnetic domains having the shapes of feathers of arrows shown in FIG. 9A with a single beam with reference to FIG. 10A through FIG. 11G. FIG. 10A is a sectional view of a magneto-optical medium 61 which is similar to that shown in FIG. 6A and FIG. 10B is a plan view as seen from a side from which a light spot is to be incident. The magneto-optical medium 61 is composed, like that shown in FIG. 6A, of a first magnetic layer 71, a second magnetic layer 72 and a third magnetic layer 73.

Furthermore, a reference numeral 95 represents a land of a track and a reference numeral 96 designates a groove. A reference numeral 105 denotes a reproducing light spot. A temperature distribution indicated by an oval isothermal line is produced on a recording medium by irradiating it with a light spot 105. It is assumed that the medium is to be displaced in a direction indicated by an arrow C. Arrows in the magnetic layers of the magneto-optical medium 61 indicate directions of atomic spins. An area which is represented by a reference numeral 108 in FIG. 10A is a high temperature area in which temperature is higher than a Curie temperature of the second magnetic layer (switching layer) 72 and the switching layer 72 is demagnetized. Accordingly, the first magnetic layer (memory layer) 71 and the displacement layer 72 are not in exchange coupling in the high temperature area 108 and the magnetic domains (marks) of the memory layer 71 are not transferred to the third magnetic layer (displacement layer) 73. In an area where exchange coupling force is active other than the high temperature area 108, the domains of the memory layer 71 are transferred to the displacement layer 73.

When the domain walls 106 and 107 of the magnetic domains recorded on the memory layer 71 are going to be located on a border between the low temperature area and the high temperature area 108, the domain wall 106 displaces toward the high temperature area in a direction indicated by an arrow D and the domain wall 107 displaces toward the high temperature area in a direction indicated by an arrow E. A reference numeral 109 represents an area in which the domain wall 106 displaces (slashed left side down) (herein after referred to as a pre-area) and a reference numeral 110 designates an area in which the domain wall 107 displaces (slashed right side down) (hereinafter referred to as a post-area). When the information is reproduced by the conventional differential detection, however, information of the domain wall 106 and that of the domain wall 107 are mixed with each other in the light spot 105, thereby making it impossible to reproduce wanted information.

This problems will be described in more detail with reference to FIGS. 11A through 11G. FIGS. 11A through 11F show a condition where a light spot 105 scans a land 95 on a track. A magneto-optical medium is displacing in a direction indicated by an arrow C as in FIG. 10A and a reference numeral 109 represents a pre-area and a reference numeral 110 designates a post-area. Let us further assume that an isolated magnetic domain 112 is recorded on the land 95 and that only the isolated land 95, for example, is magnetized upward and other magnetic domains are magnetized downward. Reference numerals 113 and 114 are domain walls formed on both sides of the isolated magnetic domain 112. FIG. 11G shows reproduced waveforms of differential signals obtained at these areas respectively.

First, FIG. 11A shows a case wherein the light spot 105 is located at a position apart from the isolated magnetic domain 112. In this condition, both the pre-area 109 and the post-area 110 are magnetized downward, and a differential detection signal is at a standard level at this time as shown in FIG. 11G. FIG. 11B shows a case where the light spot 105 comes near the isolated magnetic domain 112. In this condition, the domain wall 113 has not reached the pre-area 109 yet and the differential detection signal is at the standard level as in the case shown in FIG. 11A. FIG. 11C shows a case where the domain wall 113 has just entered the pre-area 109. In this condition, the domain wall 113 of the displacement layer 73 which is located in the pre-area 109 displaces toward the high temperature area and an area represented by a reference numeral 122 is magnetized upward. The differential signal is changed to a high level as shown in FIG. 11G.

FIG. 11D shows a case where the domain wall 114 on the opposite side has just entered the pre-area 109. The domain wall 114 of the displacement layer 73 which is located in the pre-area 109 displaces toward the high temperature area and returns to the condition where it is magnetized downward. The differential detection signal also returns to the standard level. FIG. 11E shows a case where the light spot 105 further advances and the domain wall 113 has just entered an end of the post-area 110. In this condition, the domain wall 113 of the displacement layer 73 which is located in the post-area 110 displaces toward the high temperature area and an area represented by a reference numeral 123 is magnetized upward. The differential detection signal changes to a middle level as shown in FIG. 11G. This signal level is lower than that corresponding to the pre-area 109 since a center of the high temperature area is located after a center of the light spot 105. FIG. 11F shows a case where the domain wall 114 on the opposite side has just entered the post-area 110. The domain wall 114 of the displacement layer 73 which is located in the post-area 110 displaces toward the high temperature area and returns to the condition where it is magnetized downward. The differential detection signal also returns to the standard level.

When the domain wall displacement reproduction method uses the single-beam type optical head as described above, a domain wall displaces in the two pre-area and post-area, thereby generating two pulses. In actual signals in which magnetic domains are optionally recorded, contributions by the displacements of the domain wall in the pre-area 110 and the post areas to the differential detection signal are mixed complicatedly with each other and cannot be separated as they are. To separate these contributions, there is available a method which suppresses displacement of the domain wall in the post-area by applying a magnetic field also at a reproduction time utilizing a difference between a degree of displacement of the pre-area and that of the post-area.

The domain wall displacement reproduction method which uses the single-beam type optical head requires, at a stage to manufacture a groove of media, preliminary annealing of the media, which constitutes a cause to make the media expensive. Though there is known the method which suppresses the displacement of the domain wall in the post-area by applying a magnetic field at a reproduction time, this method poses a problem to enhance power consumption. In the a case where media are not annealed, on the other hand, magnetic domains are recorded in shapes of feathers of arrows having high curvature on a memory layer as described with reference to FIG. 9B and when the magnetic domains are reproduced, the shapes of the feathers of arrows are not matched with those of borders at which a domain wall starts displacement, thereby making it impossible to displace the domain wall smooth. This problem will be described in detail with reference to FIG. 12.

Like FIG. 9B, FIG. 12 shows a condition where a recording magnetic domain 118 is recorded in a shape of a feather of an arrow on a land 91 by the magnetic field modulation method. A groove 92 is not annealed. When the land 91 is scanned by a reproducing spot 115, domain walls are displaced, thereby forming a pre-area 116 and a post-area 117. A reference numeral 121 represents a border which is to be used for staring displacement of the domain wall in the pre-area and has an arc-like shape having a center of curvature on the left side in FIG. 12. In contrast, borders (domain walls) 119 and 120 of a magnetic domain 118 have arc-like shapes having centers of curvature on the right side in FIG. 12. Since the arc-like shapes are curved in directions opposite to each other and remarkably different, the domain wall which is not annealed cannot displace smooth and displacement of the domain wall in the pre-area could not be reproduced. Though the domain walls 119 and 120 have shapes which are matched with that of the post-area, signal qualities are low and reproduced signals cannot be obtained since reproduced signals are originally low and the domain walls hardly displaces in the post-area as if a reproducing magnetic field were applied.

SUMMARY OF THE INVENTION

A primary object of the present invention is to solve the conventional technical problems described above, and provide an information reproducing method and an information recorder/reproducer which are applicable to a mark edge recording method.

Another object of the present invention is to provide a method and an information recorder/reproducer which are capable of reproducing information even when magnetized areas are formed at remarkably short intervals.

Still another object of the present invention is to provide an information reproducing method and an information recorder/reproducer which are capable of detecting high quality reproduced signals even when a medium which is not annealed is used.

According to an aspect of the present invention, there is provided a method for reproducing information from a magneto-optical medium which comprises a memory layer comprised of a magnetic film and a displacement layer comprised of a magnetic film laminated with the memory layer, records information signals with magnetized areas and being arranged in a predetermined direction on the memory layer and forms domain walls having arc shapes curved in the same direction on borders of the magnetized areas comprising the steps of:

forming a high temperature area having a shape of a circle or an elongated circle in the medium by scanning an array of the magnetized areas on the memory layer with a light spot in a direction toward convexities of the arc shapes of the magnetized areas;

transferring one of the magnetized areas together with a domain wall to the displacement layer when a front end of the high temperature area reaches a domain wall at a front end of one of the magnetized areas in the memory layer in accordance with the scanning with the light spot;

displacing the domain wall of the magnetized area transferred to the displacement layer toward a center of the high temperature area to magnify the magnetized area; and reproducing information by detecting reflected rays of the light spot in a condition where the magnetized area transferred to the displacement layer is magnified.

According to another aspect of the present invention, there is provided a method for reproducing information from a magneto-optical medium which comprises a memory layer comprised of a magnetic film and a displacement layer comprised of a magnetic film laminated with the memory layer, records information signals with magnetized areas and being arranged in a predetermined direction on the memory layer and forms domain walls having arc shapes curved in the same direction on border of the magnetized areas comprising the steps of:

forming in the medium a first temperature area having a shape of a circle or an elongated circle where temperature is higher than that in an area not irradiated with a light spot, and a second ring-like temperature area which is located around the first temperature area, and in which temperature is higher than that in the area not irradiated with the light spot and lower than that in the first temperature area by scanning an array of the magnetized areas in the memory layer with a light spot in a direction toward concavities of the arc shapes of the magnetized areas;

transferring a magnetized area in the memory layer to the displacement layer in the second temperature area without transferring the magnetized area in the memory layer to the displacement layer in the first temperature area in accordance with the scanning with the light spot;

displacing a domain wall at a front end of the arc-like magnetized area transferred to the displacement layer toward a center of the first temperature area to magnify the magnetized area when a rear end of the first temperature area reaches a domain wall at a front end of one of the magnetized areas in accordance with the scanning with the light spot; and reproducing information by detecting reflected rays of the light spot in a condition where the magnetized area transferred to the displacement layer is magnified.

According to still another aspect of the present invention, there is provided a method for recording and reproducing information on and from a magneto-optical medium which comprises a memory layer comprised of a magnetic film and a displacement layer comprised of a magnetic film and laminated with the memory layer comprising the steps of:

applying a magnetic field modulated according to information to a location of the medium irradiated with a light spot while scanning the medium with the light spot in a first direction, whereby magnetized areas arranged in the first direction are formed and domain walls having arc shapes curved in the first direction are formed on borders of the magnetic areas to record information;

forming a high temperature area having a shape of a circle or an elongated circle in the medium by scanning an array of the magnetized areas on the memory layer in a second direction reverse to the first direction;

transferring one of the magnetized areas together with a domain wall to the displacement layer when a front end of the high temperature area reaches a domain wall at a front end of one of the magnetized areas in the memory layer in accordance with the scanning with the light spot;

displacing the domain wall of the magnetized area transferred to the displacement layer toward a center of the high temperature area to magnify the magnetized area; and reproducing information by detecting reflected rays of the light spot in a condition where the magnetized area transferred to the displacement layer is magnified.

The signals of the information in the above-mentioned method for recording and reproducing information may be rearranged per predetermined unit to record the information on the medium.

The above-mentioned method for recording and reproducing information may further comprises a step of adding to the information preamble information for creating a sampling clock per predetermined unit, to record the information on the medium.

The medium in the above-mentioned method for recording and reproducing information may be a disk-like medium on which tracks are formed concentrically or spirally and wherein the predetermined unit consists of an information amount which is smaller than a capacity of an innermost track of the disk-like medium.

The above-mentioned method for recording and reproducing information may further comprises a step of recording management information for managing information to be recorded on the medium at a line density lower than that of other information and enabling information to be reproduced by a method other than a method wherein a domain wall is displaced.

The above-mentioned method for recording and reproducing information may further comprises a step of erasing signals of recorded information by scanning the medium with the light spot in the first direction.

According to a further aspect of the present invention, there is provided an apparatus for recording information on a magneto-optical medium comprised of a memory layer comprised of a magnetic film and a displacement layer comprised of a magnetic film laminated with the memory layer and reproducing the recorded information comprising:

means for scanning the medium with a light spot;

means for recording information by applying a magnetic field modulated according to information to a location of the medium irradiated with the light spot;

means for reproducing information recorded on the medium by detecting rays of the light spot reflected from the medium; and means for changing a scanning direction of the light spot between an information recording time and an information reproducing time.

According to a further aspect of the present invention, there is provided an apparatus for recording information on a magneto-optical medium comprised of a memory layer comprised of a magnetic film and a displacement layer comprised of a magnetic film laminated with the memory layer and reproducing the recorded information comprising:

an optical head for projecting a light spot to the medium;

a magnetic head for applying a magnetic field modulated according to information to a location of the medium irradiated with the light spot;

a photodetector for detecting rays of the light spot reflected by the medium;

a motor for moving the medium relative to the light spot; and means for changing a direction of the medium which is moved relatively between a recording time and a reproducing time.

The medium in the above-mentioned apparatus for recording and reproducing information may be a disk-like medium on which tracks are formed concentrically or spirally, the motor is a spindle motor which rotates the disk-like medium and the changing means changes a rotating direction of the spindle motor between an information recording time and an information reproducing time.

DETAILED DESCRIPTION OF THE PREFERRED EMBODIMENTS

Figure 13A:
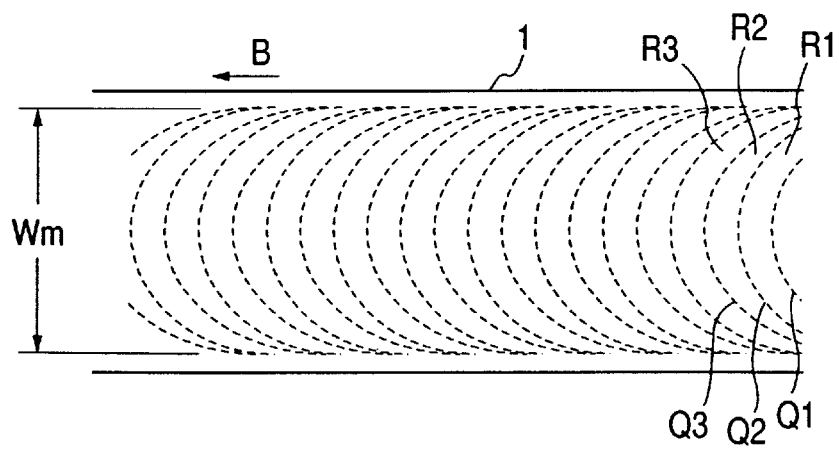
FIGS. 13A and 13B are diagrams descriptive of a first embodiment of the information reproducing method according to the present invention.
Figure 13B:
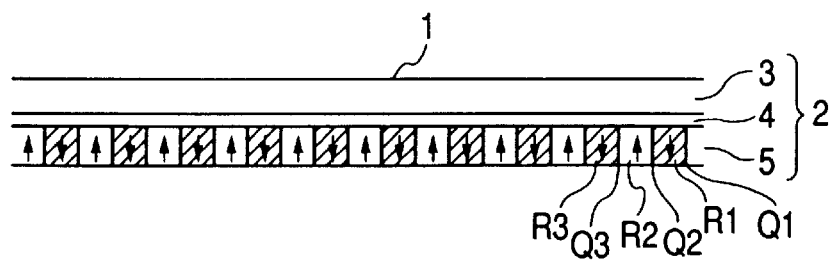

Now, the preferred embodiments of the present invention will be described in detail with reference to the accompanying drawings. First, a description will be made of a first embodiment of the information reproducing method according to the present invention. FIGS. 13A and 13B are partial enlarged views of a magneto-optical medium 1 to be used in the first embodiment. FIG. 13A is a top view and FIG. 13B is a sectional view. In FIGS. 13A and 13B, the magneto-optical medium 1 consists of a substrate (not shown) and a magnetic layer 2 which is disposed on the substrate. The magnetic layer 2 is composed of two layers of magnetic materials, that is, a memory layer 5 made of TbFeCo and a displacement layer 3 made of GdFeCo. A switching layer 4 made of a nonmagnetic material such as SiN is interposed between the memory layer 5 and the displacement layer 3.

The memory layer 5 is a perpendicular magnetization film, and is made of a material which has a low degree of displacement of domain wall and a high domain wall coercivity. Furthermore, the displacement layer 3 is an internal magnetization film at a temperature not exceeding T1, but a perpendicular magnetization film which has a high degree of displacement of domain wall and a low domain wall coercivity at a temperature higher than T1. Arc-like magnetized areas R1, R2, R3, . . . which are magnetized upward and downward are formed alternately in a row on the memory layer 5 as shown in FIGS. 13A and 13B. The magnetized areas R1, R2, R3, . . . have a width Wm, for example, of 0.6 μm. Furthermore, arc-like domain walls Q1, Q2, Q3, . . . all of which are curved in the same direction are formed on borders between front ends and rear ends of the magnetized areas R1, R2, R3, . . . In FIG. 13 A which is a diagram as seen from the displacement layer 3, the domain Q1, Q2, Q3, . . . walls formed on the memory layer 5 are traced in dashed lines.

The row of the magnetized areas R1, R2, R3, . . . accompanied by the arc-like domain walls Q1, Q2, Q3, . . . which are curved in the same directions are formed by the method (magnetic field displacement recording method) which displaces the magneto-optical medium 1 relative to a recording light beam in a direction indicated by an arrow B in FIG. 13A while irradiating the magnetic layer 2 with the recording light beam condensed to a fine light spot and perpendicularly applies to an area irradiated with the recording light beam a magnetic field which varies in a vertical direction correspondingly to information signals to be recorded.

Now, a method to magnify and reproduce a magnetic domain in the first embodiment will be described with reference to FIGS. 14A through 14E. When the magnetized areas R1, R2, R3, . . . are to be detected first, the magneto-optical medium 1 is displaced relative to a reproducing light beam while irradiating the magnetic layer 2 of the magneto-optical medium 1 with the reproducing light beam which is condensed to a fine light spot. FIG. 14A through 14E sequentially show status changes which occur on the magnetic layer 2 as a time elapses. An arrow A in FIG. 14A indicates a displacement direction of the magneto-optical medium 1 which is reverse to the displacement direction (indicated by the arrow B in FIG. 13A) at the stage to record information signals. When the magnetic layer 2 is irradiated with the reproducing light beam, it is partially heated and a reference numeral 7 in FIGS. 14A through 14E represents an isothermal line of a temperature T1 which is obtained as a result of the heating. In an area outside the isothermal line 7, temperature is lower than T1 and the displacement layer 3 is the internal magnetization film. An area which has a shape of a circle or an elongated circle (ellipse or egg) of the displacement layer 3 enclosed by the isothermal line 7 is a high temperature area 9 (hereinafter referred to as a transfer area). In the transfer area 9, temperature is higher than T1 and the displacement layer 3 is a perpendicular magnetization film. Furthermore, the transfer area 9 has a width W1 which is smaller than the width Wm of the magnetized areas R1, R2, R3, . . . formed on the memory layer 5 and, for example, 0.5 μm.

Figure 14A:
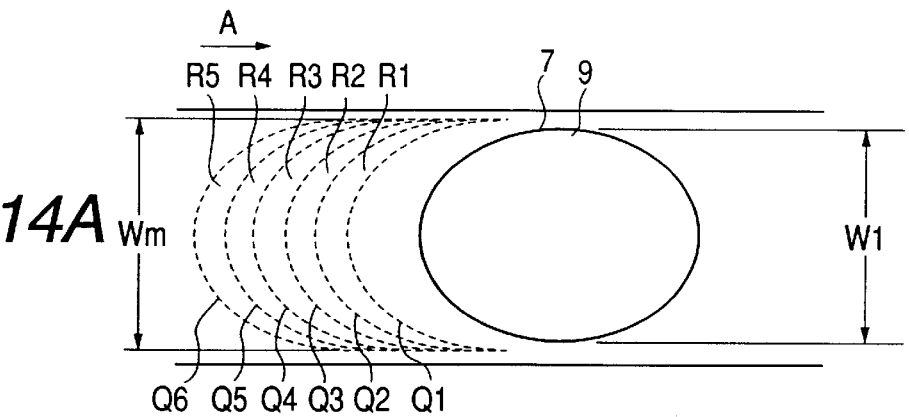
FIGS. 14A, 14B, 14C, 14D and 14E are diagrams descriptive of a method to magnify and reproduce magnetic domains in the first embodiment.
Figure 14B:
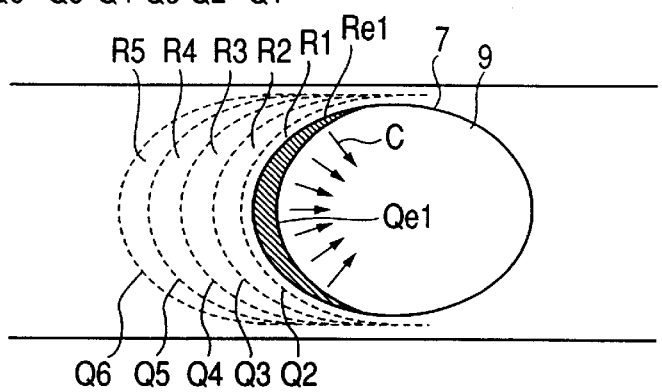

First, FIG. 14A shows a status immediately before a reproducing operation, wherein the magnetized areas R1, R2, R3, . . . formed on the memory layer 5 are not located right under the transfer area 9 of the displacement layer 3 and the memory layer 5 which is located right under the transfer area 9 is magnetized upward. As a result of magnetostatical coupling with the memory layer 5, magnetization of the memory layer 5 is transferred to the transfer area 9, whereby it is magnetised upward. When the magneto-optical medium 1 displaces with a time lapse, a front end (right end in FIGS. 14A through 14E) of the magnetized area R1 which is formed on the memory layer 5 and magnetized downward is partially located right under the transfer area 9 from the front (left side in FIGS. 14A through 14E) of the transfer area 9 as shown in FIG. 14B. A portion of the magnetized area R1 which is located right under the transfer area 9 (that is, isothermal line 7) is transferred to the transfer area 9, whereby a crescent-shaped magnetized area Re1 which is magnetized downward is transferred and formed at a location close to a front edge of the transfer area 9 and a domain wall Qe1 which is curved in the same direction as the front edge of the transfer area 9 is transferred and formed so as to have ends attaining to edges of the transfer area 9.

Figure 14C:
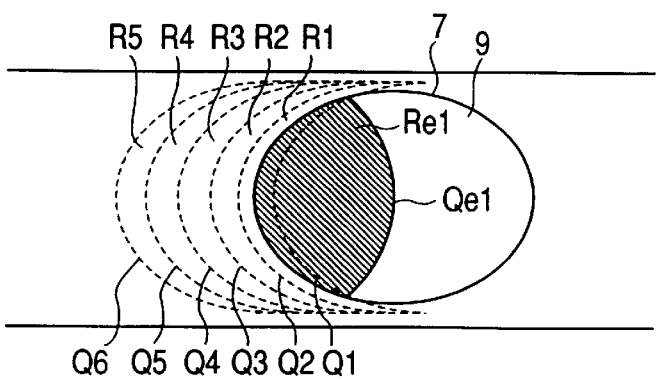

A driving force directed toward higher temperature, or toward a center of the transfer area 9, as indicated by an arrow C is exerted to each portion of the domain wall Qe1 transferred and formed on the transfer area 9. Since the transfer area 9 has a high degree of displacement of domain wall and a low domain wall coercivity, the domain wall Qe1 is displaced by the driving force toward the center of the transfer area 9 as shown in FIG. 14C, whereby the transferred magnetized area Re1 is magnified in the transfer area 9. At both the ends of the domain wall Qe1 which are close to the edges of the transfer area 9, the driving force exerted to the domain wall Qe1 to displace the domain wall Qe1 is directed nearly perpendicular to the isothermal line 7, or the edges of the transfer area 9. Accordingly, portions of the domain wall Qe1 which are closer to its ends are displaced for shorter distances in a direction along the edge of the transfer area 9 and middle portions of the domain wall Qe1 are displaced for long distances toward the center of the transfer area 9, whereby the domain wall Qe1 is deformed and curved in a direction which is reverse to that before the displacement (the state in FIG. 14B).

Figure 14D:
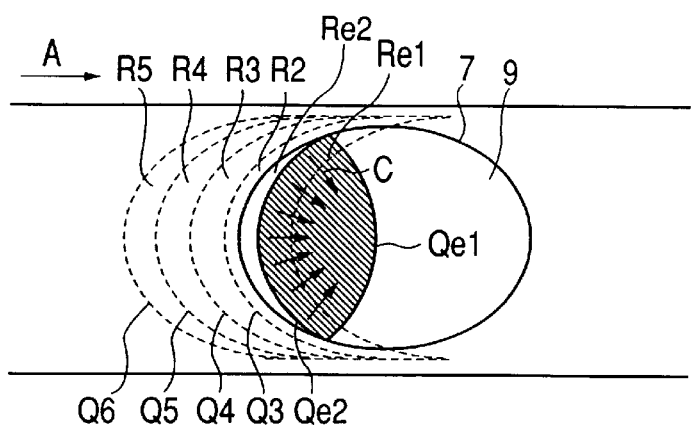
Figure 14E:
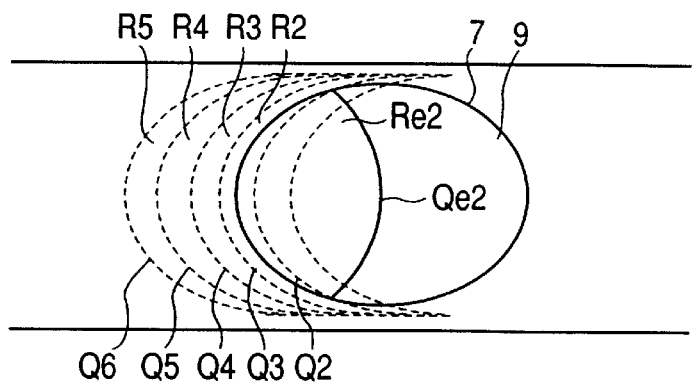

With a further time lapse, the magneto-optical medium 1 displaces and a front end of the subsequent magnetized area R2 which is formed on the memory layer 5 and magnetized upward is partially located right under the transfer area 9 as shown in FIG. 14D. At this time, a portion of the magnetized area R2 which is located right under the transfer area 9 is transferred to the transfer area 9, a crescent-shaped magnetized area Re2 which is magnetized upward is transferred and formed at a location close to an edge of the transfer area 9, and a domain wall Qe2 which is curved in the same direction as the edge of the transfer area 9 is transferred and formed so as to have ends attaining to the edges of the transfer area 9. A driving force directed toward high temperature, or toward the center of the transfer area 9 as shown by an arrow C, is exerted to each portion of the domain wall Qe2 which if transferred and formed on the transfer area 9. Accordingly, the domain wall Qe2 is displaced, like the domain wall Qe1, toward the center of the transfer area 9 and curved in the reverse direction, whereby the magnetized area Re2 which is transferred and magnetized upward is magnified in the transfer area 9 as shown in FIG. 14E. Simultaneously, the magnetized area Re1 which is magnified before is contracted and disappeared.

When a rear portion Z (right side portion in FIG. 14D) of the transfer area 9 is magnetized upward, the magnetized area Re2 which is magnetized also upward is integrated with the rear portion of the transfer area 9 after the magnification, whereby the domain wall Qe2 is actually disappeared immediately after displacement to a location shown in FIG. 14E. Each time magnetized areas R3, R4, R5, . . . formed on the memory layer 5 are located right under the transfer area 9 one after another, domain walls transferred and formed on the transfer area 9 are displaced, and magnetized areas which are magnetized upward and downward are alternately magnified by repeating the operations shown in FIGS. 14B through 14E. However, magnetized wall formed in the memory layer 5 are not displaced since the memory layer has the low degree of displacement of domain wall and the high domain wall coercivity.

The magnetized area which is magnified can be detected with the reflected light beam of the reproducing light spot utilizing a magneto-optical effect. Since detection signals can be enhanced to a higher signal level by magnifying the magnetized area, the magnetized areas can be detected even when magnetized areas R1, R2, R3, . . . which are formed on the memory layer 5 have diameters shorter than a diameter of the reproducing light beam. In the first embodiment, a condition immediately before starting the signal reproducing operations is taken, to facilitate understanding, as the condition shown in FIG. 14A, that is, a condition where the magnetized areas formed on the memory layer 5 are not located right under the transfer area of the displacement layer 3 and the transfer area 9 is magnetized as a whole in a definite direction. However, a condition immediately before the reproducing operations is not necessarily the condition shown in FIG. 14A and the operations shown in FIGS. 14B through 14E are repeated by starting the reproducing operations regardless of a magnetized condition of the memory layer 5.

Though it is assumed that a direction of magnetization of the rear portion (right side portion in the drawings) of the transfer area 9 is upward and remains unchanged in the foregoing description, the magnetized areas may actually be transferred and formed due to magnetostatical coupling with the magnetized area of the memory layer 5 which is located right under the rear portion of the transfer area 9, whereby curved domain walls may be transferred and formed. Even when the domain wall is transferred and formed, however, it is curved in the direction reverse to the edge of the rear end of the transfer area 9. For a reason similar to that described with reference to the related art, it is impossible to displace a domain wall in the rear portion of the transfer area, thereby magnifying the transferred and formed magnetized area so far as a magnetic field is not applied. Therefore, a magnetized area which is transferred and formed on the rear portion of the transfer area, if any, gives no influence on signal reproduction.

Though both ends of the domain wall which is transferred and formed on the transfer area 9 displace for the short distance in the directions along edges o the transfer area 9 in the first embodiment described above, the transferred magnetized area is magnified by deforming it so as to be curved in the reverse direction. Moreover, it is not always necessary to prolong the domain wall for magnification of the magnetized area which is formed by the transfer as understood from FIGS. 14A through 14E and the magnetized area which is formed by the transfer may be magnified when a length of the domain wall is scarcely changed or even when it is shortened. Accordingly, the displacement of the domain wall requires no remarkable increase of energy and the first embodiment application of a magnetic field in a direction of magnetization of the magnified area unlike the conventional art.

Furthermore, a higher temperature gradient from the edge toward the center of the transfer area 9 is desirable since such a gradient enhances a curvature of the domain wall formed by the transfer in the reverse direction and the transferred magnetized area is magnified to a larger area, thereby enlarging a signal to be detected. When a temperature gradient is not so high as to curve the domain wall in the reverse direction and the domain wall is deformed nearly linearly, however, the first embodiment provides an effect to enhance a detection signal since it magnifies the magnetized area to a size which is not so large as that in the example described above. Though the first embodiment is configured to heat the magnetic layer 2 of the magneto-optical medium 1 by irradiating it with the reproducing light beam, thereby forming the transfer area 9 on the displacement layer 3, it is possible to form the transfer area 9 in the displacement layer 3 by heating means which displaces relative to the magneto-optical medium 1 separately from the reproducing light beam, for example by irradiating with magnetic layer 2 with a heating light beam.

Furthermore, a domain wall which is formed so as to reach the edge of the transfer area 9 is displaced easily. To magnify a magnetized area which is formed by transfer to a larger size, it is desirable to transfer and form the domain wall so as to have a long distance between its ends, or so as to reach edges of the transfer area 9 at a location in the vicinity of a broadened portion of the transfer area 9. For this purpose, it is desirable that the width W1 of the transfer area 9 is smaller at least than the width Wm of the magnetized area formed on the memory layer 5. Since a size of the transfer area 9 is nearly proportional to an irradiating intensity of the reproducing light beam or the heating light beam used to form the transfer area 9, it is possible to form the transfer area 9 so as to have an adequate width W1 by adequately setting an irradiating intensity of the reproducing light beam or the heating light beam.

The magnetic layer 2 of the magneto-optical medium 1 may be composed of three layers made of magnetic materials which are different from those used in the example described above, for example, a memory layer 5 made of TbFeCo, a switching layer 4 made of TbFe and a displacement layer 3 made of GdFe. A magnetic domain magnification reproducing method which uses such a magneto-optical medium is described in detail in Japanese Patent Application Laid-Open No. 6-290496 applied by the inventor. The displacement layer 3 is a perpendicular magnetization film having a domain wall coercivity which is lower than that of the memory layer 5 and a degree of displacement of domain wall which is higher than that of the memory layer 5, the switching layer 4 has a Curie temperature which is lower than those of the displacement layer 3 and the memory layer 5, and the memory layer 5 has a high domain wall coercivity and a low degree of displacement of domain wall.

The magnetic domain magnification reproducing method which uses such a magneto-optical medium can be described with reference to FIGS. 14A through 14E. In FIGS. 14A through 14E, the displacement layer 3 is exchange coupling with the memory layer 5 by way of the switching layer 4 in an area outside the isothermal line 7 (area outside the transfer area 9). Accordingly, the magnetized areas R1, R2, R3, . . . formed on the memory layer 5 are preliminarily transferred and formed together with the arc-like domain walls Q1, Q2, Q3, . . . on the displacement layer 3. As the magneto-optical medium 1 displaces, the front end (right end in FIGS. 14A through 14E) of the magnetized area R1 which is formed by transfer on the displacement layer 3 is partially located inside the transfer area 9 as shown in FIG. 14B. At this time, the switching layer 4 is demagnetized in the transfer area 9 where temperature is higher than T1 and the displacement layer 3 is not in exchange coupling with the memory layer 5. Accordingly, a restricting force produced by exchange coupling is not exerted to the magnetized area R1, a portion Re1 of the domain wall Q1 which is located inside the transfer area 9 on the displacement layer 3, and the domain wall We1 is displaced by the driving force directed toward the center of the transfer area 9 as shown in FIG. 14C, whereby the magnetized area Re1 is magnified in the transfer area 9. When the subsequent domain wall Q2 is located inside the transfer area 9, it is displaced as shown in FIGS. 14B and 14C, whereby the magnetized area R2 is magnified in the transfer area 9.

For a magneto-optical medium which has such a configuration as that in the example described above and magnetic domain magnification reproduction using the magneto-optical medium, it is conventionally necessary to take a measure to break magnetic coupling between recording tracks, for example, by projecting a high output of laser beam between adjacent recording tracks at a manufacturing stage as disclosed by Japanese Patent Application Laid-Open No. 6-290496 to facilitate to displace a domain wall, thereby magnifying a magnetized area. However, the reproducing method according to the present invention is capable of magnifying a magnetized area by displacing it while deforming it so as to be curved in a reverse direction though both ends of the domain wall are displaced for short distances. Accordingly, the reproducing method according to the present invention eliminates the conventional necessity to break the magnetic coupling between recording tracks.

Now, description will be made of an embodiment of the information recorder/reproducer which is used for the information reproducing method described above.

Figure 15:
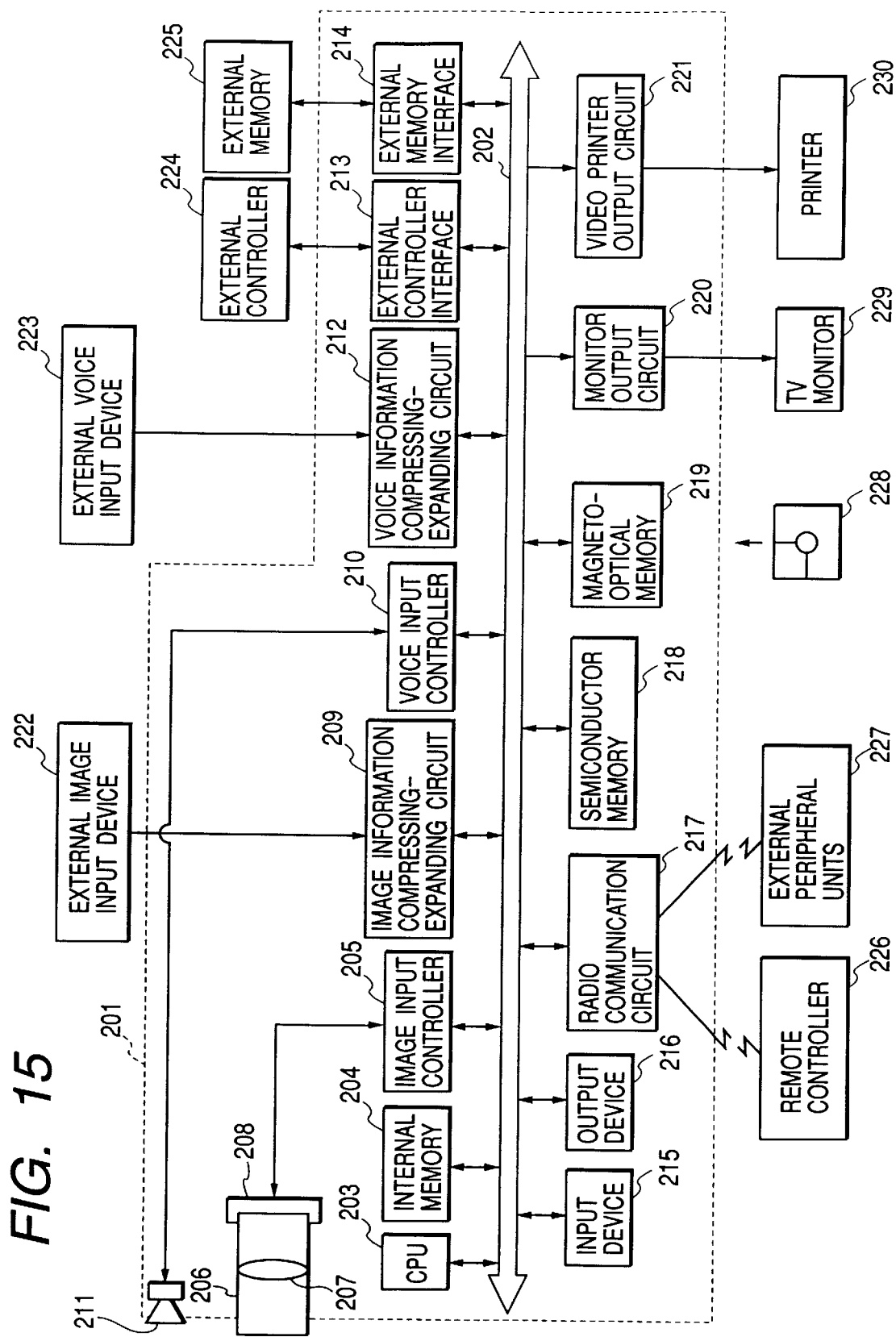
FIG. 15 is a block diagram exemplifying a configuration of an information recorder/reproducer used for the information reproducing method preferred as the first embodiment.

FIG. 15 is a block diagram illustrating a configuration of the embodiment of the information recorder/reproducer according to the present invention. In this embodiment, a disk cam coder which records and reproduces sequential information on an magneto-optical disk will be described as an example of information recorder/reproducer. In FIG. 15, a disk cam coder 201 is an apparatus which is capable of recording and reproducing image information and voice information by photographing an image. The disk cam coder 201 comprises a CPU 203 which controls operations of the apparatus as a whole as well as a bus 202 which transmits and receives various kinds of information in the apparatus. Furthermore, an internal memory 204 consists of ROM and RAM which store a control program and various kinds of information, and an image input controller 205 is a circuit which receives movie or still image information from an image input section 6 and converts the information into digital signals. The image input section 206 consists of an imaging system 207 composed of a lens and the like and a photoelectric converter 208 and so on. An image information contracting-expanding circuit 209 contracts and expands image information input from the image input section 206 and image information input from outside.

A voice input controller 210 is a circuit which receives voice information from a microphone 211 and converts the information into digital signals or analog signals having modulated frequencies, and a voice information contracting-expanding circuit 212 is a circuit which contracts and expands voice information input from the voice input controller 210 and voice information input from outside. Furthermore, the disk cam coder 201 is connected to an external image input device 222, and image information input from the image input controller 205 and the external image input device 222 is contracted by the image information contracting-expanding circuit 207, stored into a semiconductor memory 218 which is a buffer memory and then recorded as digital signals in a magneto-optical disk 228 disposed in a magneto-optical memory section 219. Similarly, the disk cam coder 201 is connected to an external voice input device 223, and voice information input from the voice input controller 210 and the external voice input device 223 is contracted by the voice information contracting-expanding circuit 212, temporarily stored in the semiconductor memory 218 and then recorded as digital signals on the magneto-optical disk 228.

Image information, voice information and the image information recorded on the magneto-optical disk 228 can be displayed on a TV monitor 229 by way of a monitor output circuit 220 and printed out by a printer 230 by way of a video printer output circuit 221. The disk cam coder 201 is connected to an external controller 224 such as a personal computer by way of an external controller interface 213. It is connected by way of an external memory interface 214 which enables information transception with an external memory 225 such as a floppy disk memory or an IC memory. The external controller 224 is a computer or the like which is capable of delicately controlling voice information inputs and outputs to and from the disk cam coder 201, and processing image information recorded on the magneto-optical disk 228.

To compose a configuration for independent operation of the disk cam coder 201 by a user, there are disposed an input device 215 consisting of keys for inputting various kinds of instructions, a plurality of switches for inputting timings to receive image information and voice information, etc., an output device 216 displaying search screens for contents of instructions issued to the disk cam coder 201, operations and information, and a radio communication circuit 217 capable of transmitting information to an external peripheral device 227. Used as the magneto-optical disk 228 is a magnetic domain reproduction type medium which enables the magnetic domain replacement reproduction described with reference to the conventional area and is not annealed.

Figure 1A:
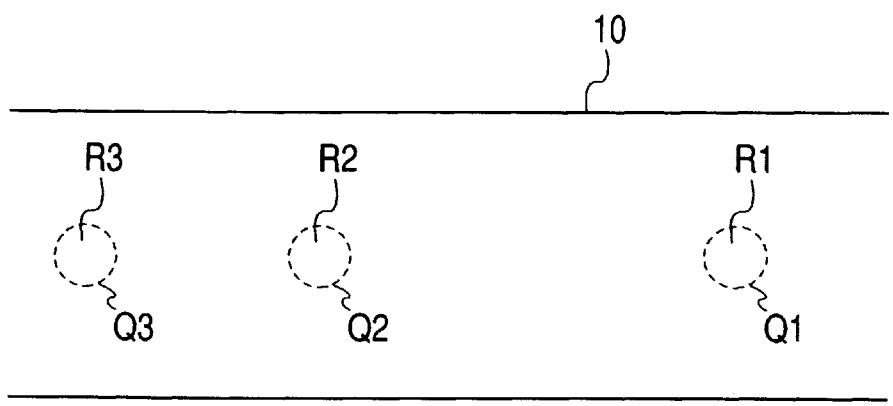
FIGS. 1A, 1B, 2A, 2B, 2C and 2D are diagrams descriptive of an example of conventional information reproducing method which reproduces information by magnifying a magnetic domain.
Figure 1B:
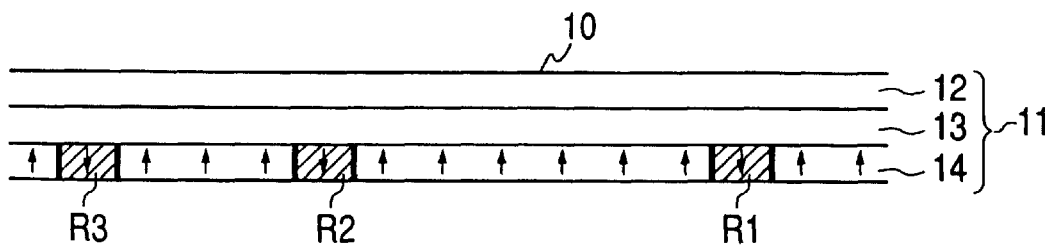
Figure 2A:
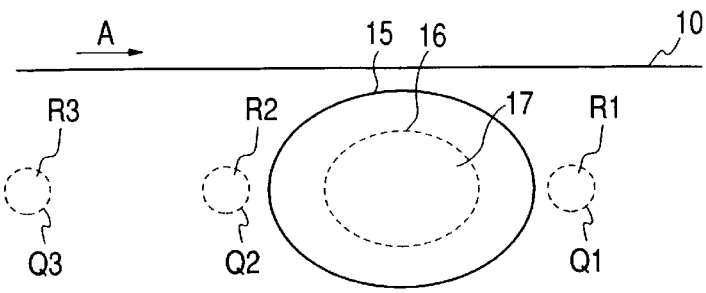
Figure 2B:
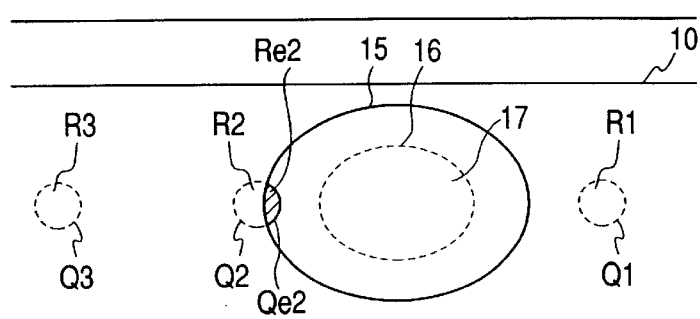
Figure 2C:
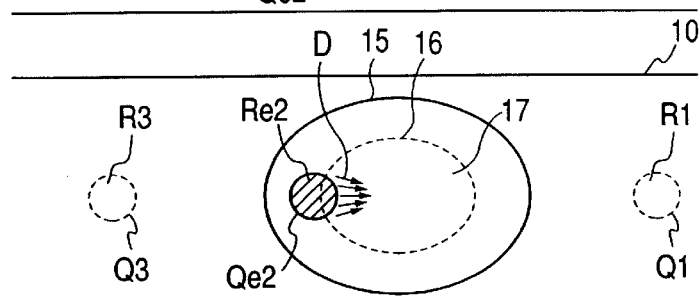
Figure 2D:
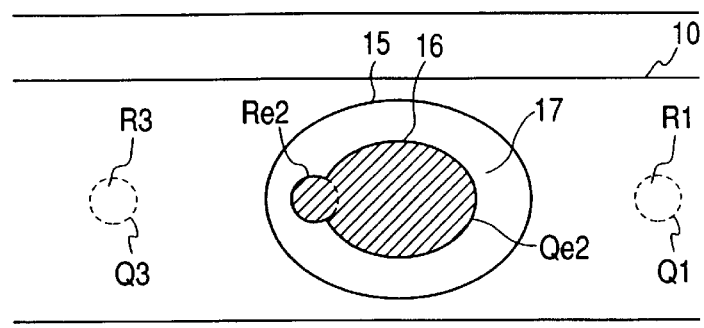
Figure 3:
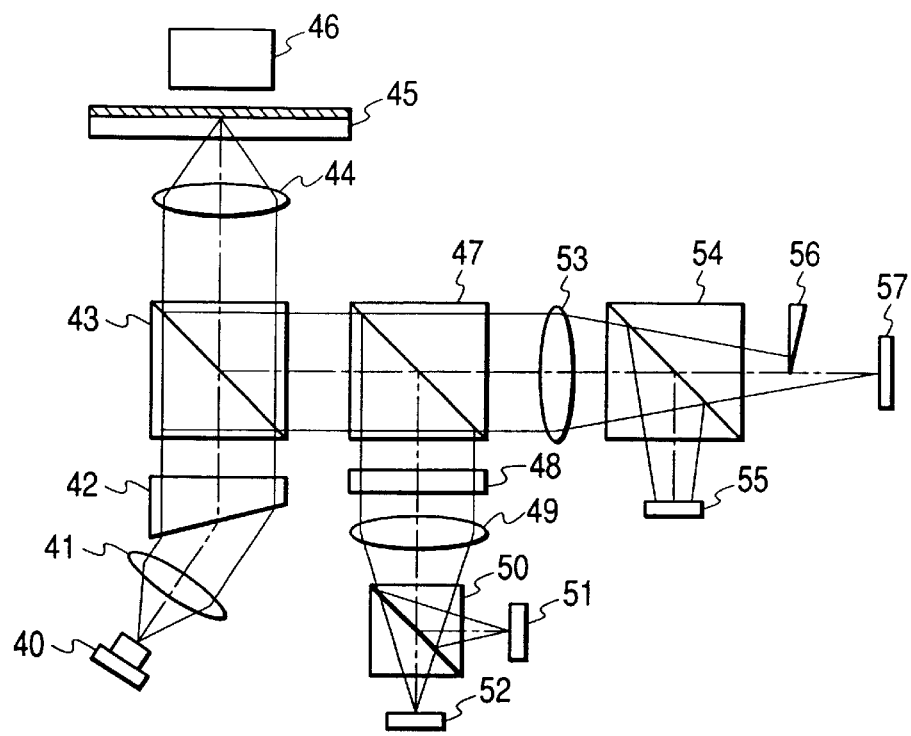
FIG. 3 is a diagram exemplifying a configuration of a conventional optical head.
Figure 4:
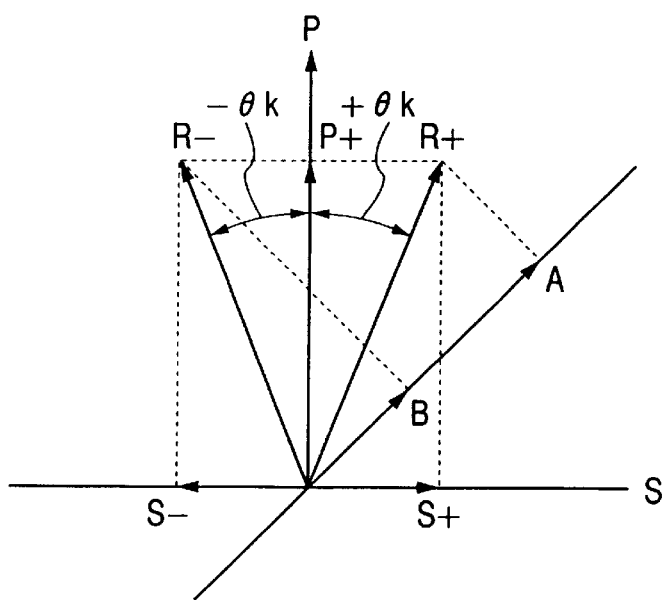
FIG. 4 is a diagram descriptive of a principle to reproduce a magneto-optical signal.
Figure 5:
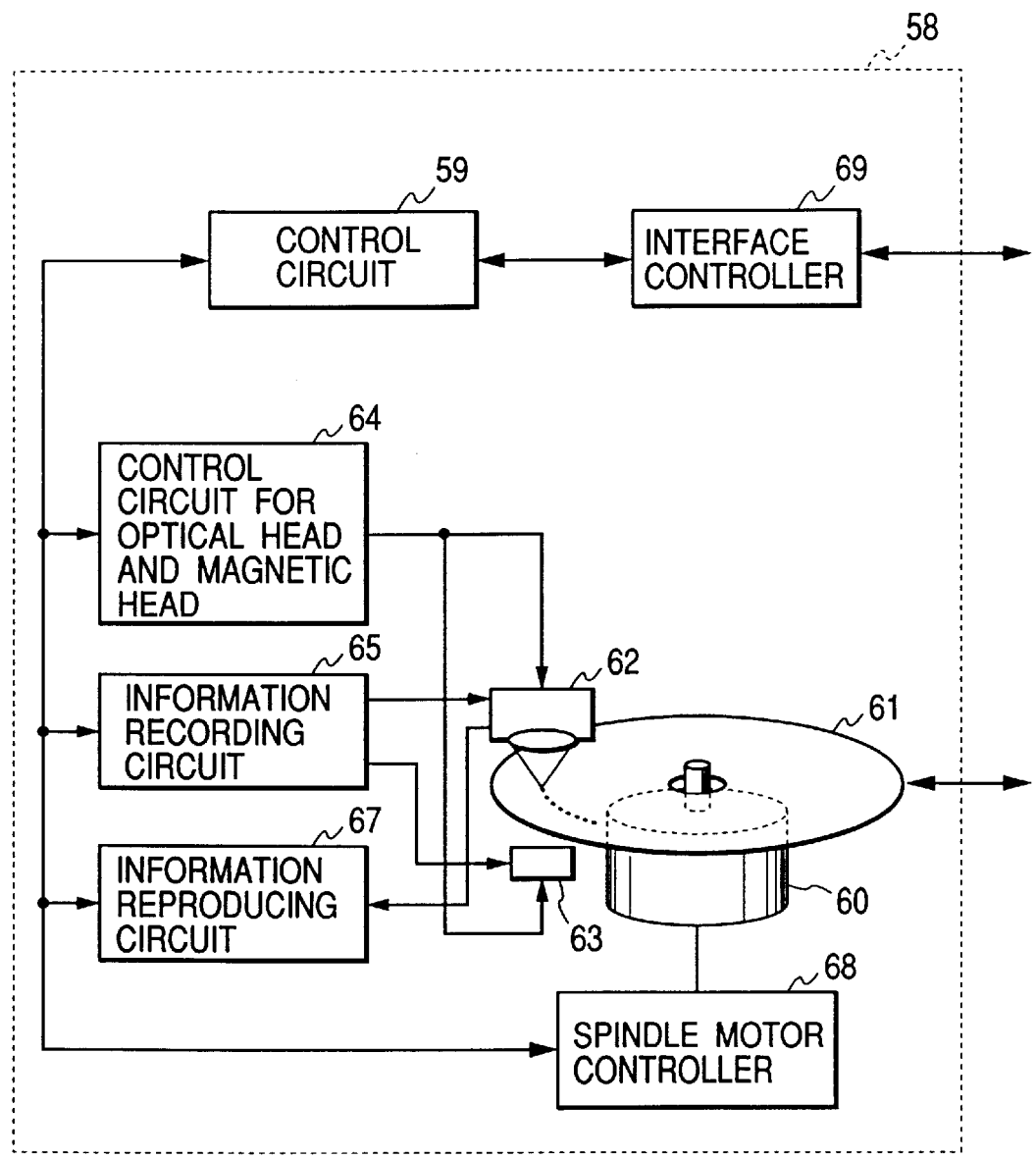
FIG. 5 is a diagram exemplifying a configuration of a magneto-optical information recorder/reproducer using a domain wall displacement reproduction method.
Figure 6A:
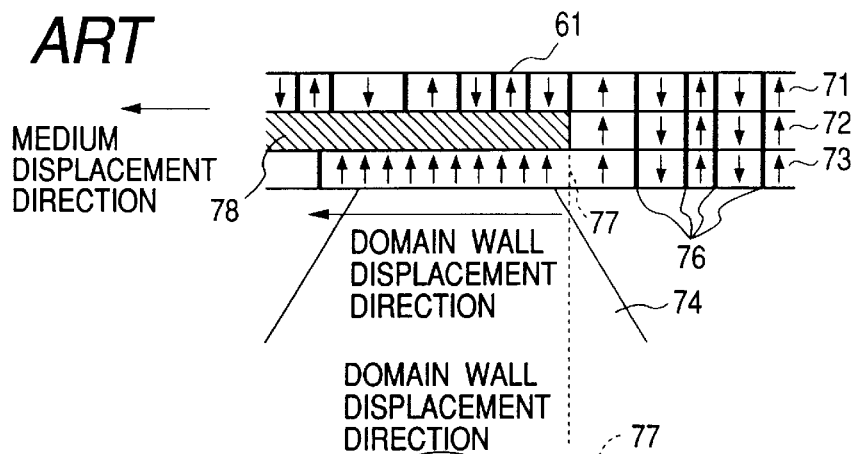
FIGS. 6A, 6B, 6C and 6D are diagrams descriptive of a domain wall displacement type magneto-optical recording medium and its functions.
Figure 6B:
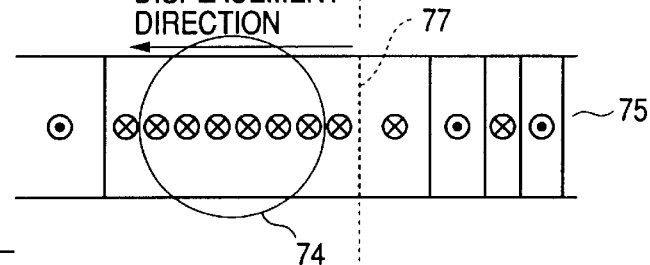
Figure 6C:
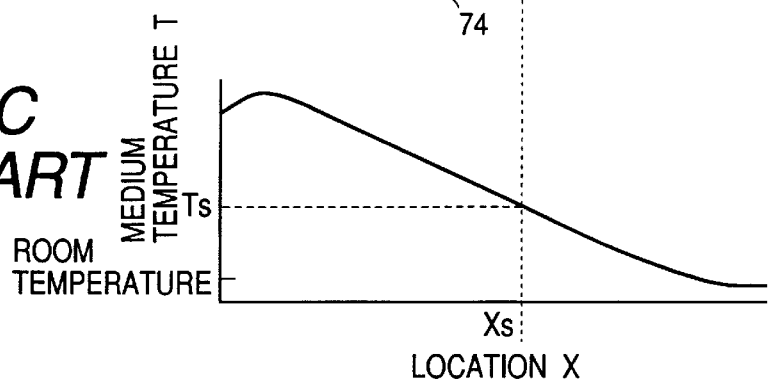
Figure 6D:
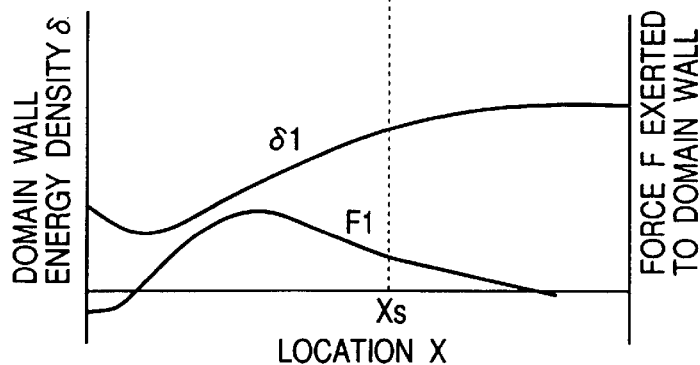
Figure 7:
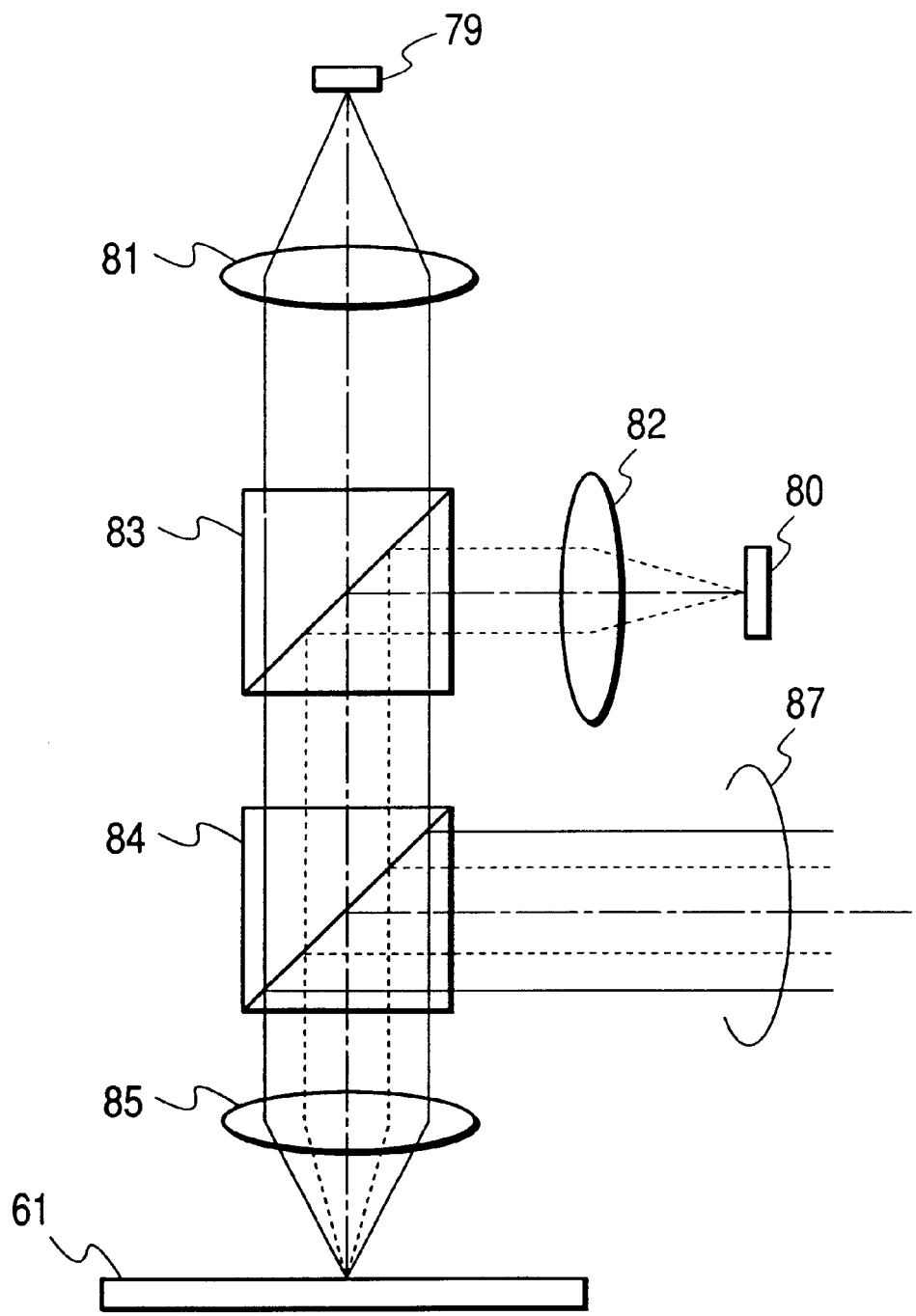
FIG. 7 is a diagram exemplifying an optical head used in the recorder/reproducer shown in FIG. 5.
Figure 8A:
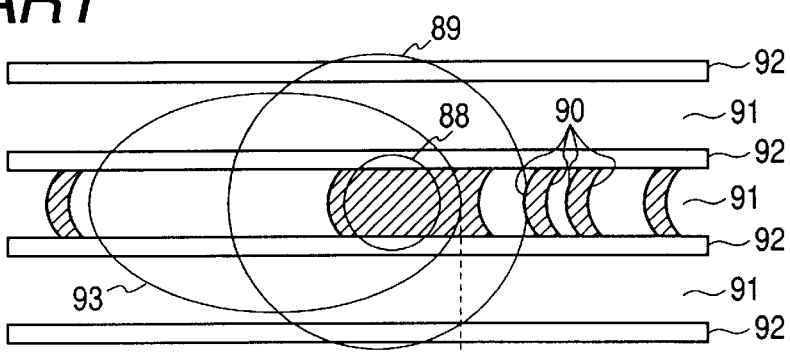
FIGS. 8A and 8B are diagrams descriptive of operations to reproduce a domain wall displacement using the optical head shown in FIG. 7.
Figure 8B:
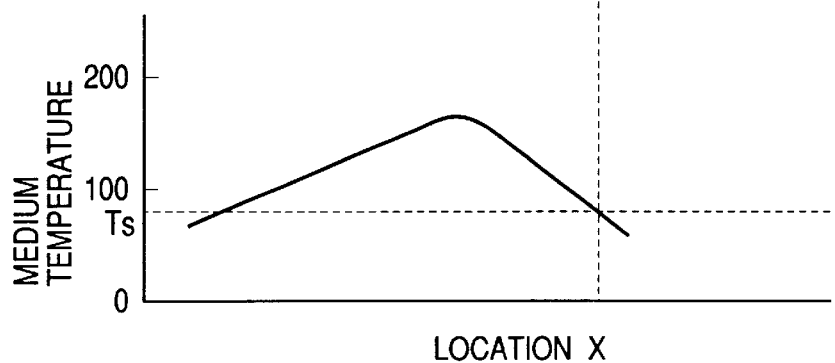

Furthermore, used as the magneto-optical memory is a recorder/reproducer which is the same as that shown in FIG. 5 which is described with reference to the conventional art. That is, recording of sequential information is performed by the magnetic field modulation recording method which records the information by applying from the magnetic head 63 a magnetic field modulated correspondingly to information to be recorded while projecting a light beam from the optical head 62 shown in FIG. 5 and reproduction of the sequential information is performed by the domain wall displacement reproducing method using a single beam described with reference to the conventional art. However, this embodiment is configured so that a rotating direction of the magneto-optical disk 228 for the recording operations is reversed for reproducing operations.

Figure 9A:
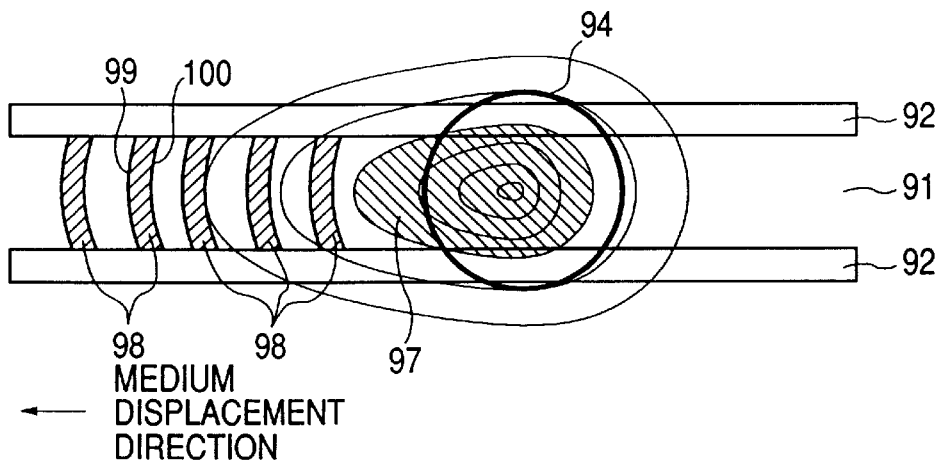
FIGS. 9A and 9B are diagrams showing shapes of magnetic domains on a medium which is annealed and those on a medium which is not annealed.
Figure 9B:
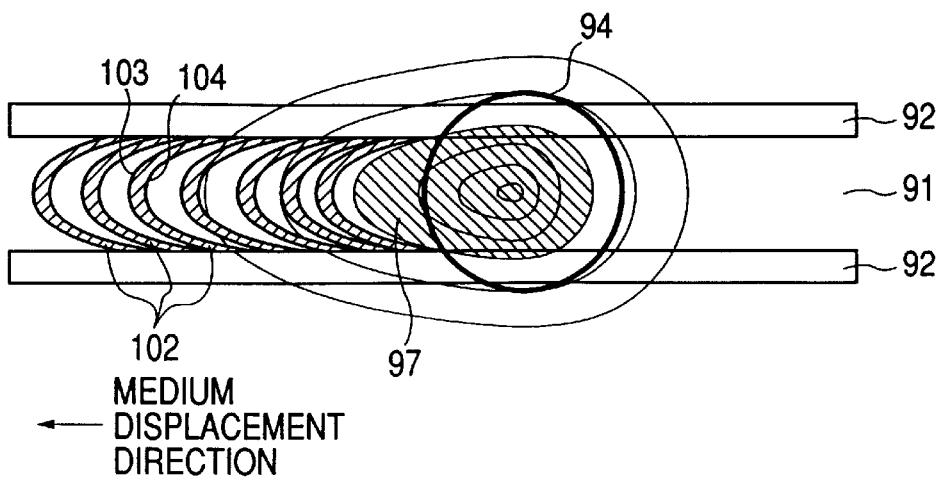
Figure 10A:
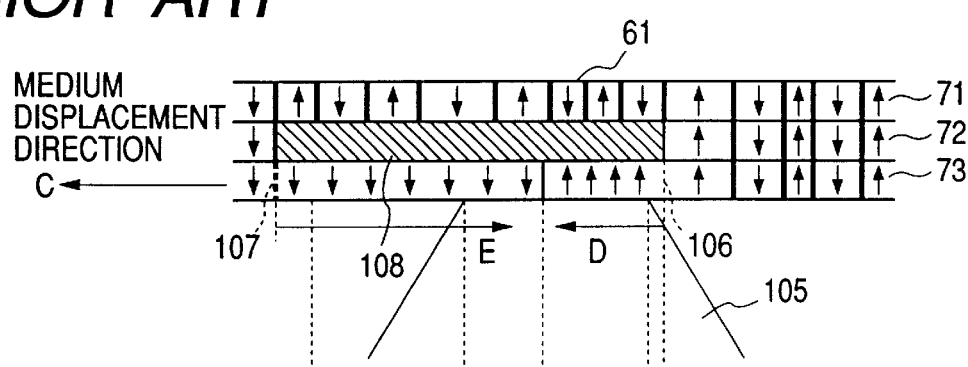
FIGS. 10A, 10B, 11A, 11B, 11C, 11D, 11E, 11F and 11G are diagrams descriptive of operations to reproduce the recording magnetic domains shown in FIG. 9A with a single light beam.
Figure 10B:
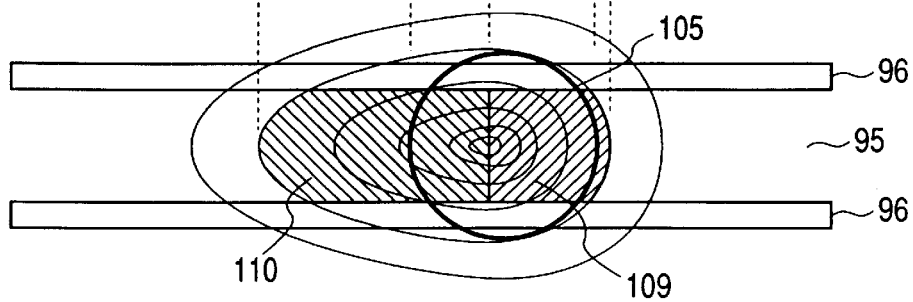
Figure 11A:
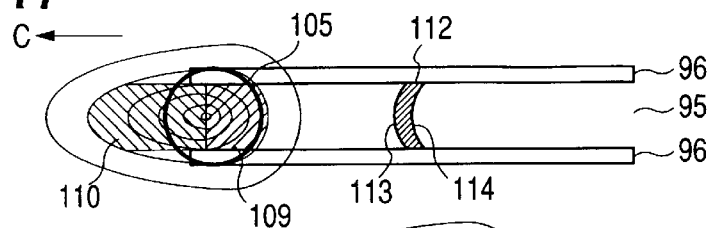
Figure 11B:
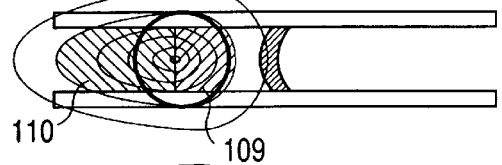
Figure 11C:
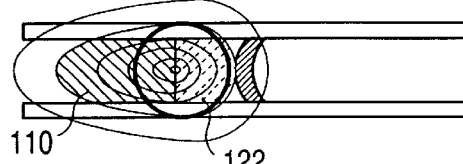
Figure 11D:
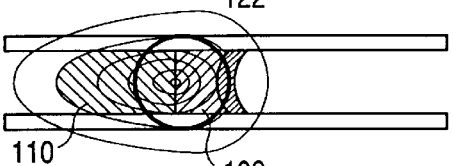
Figure 11E:
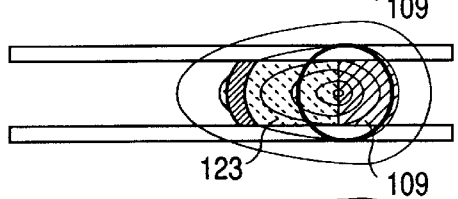
Figure 11F:
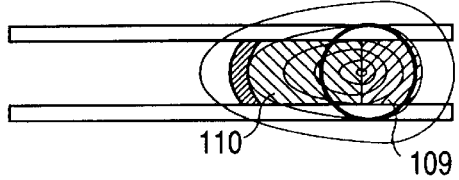
Figure 11G:
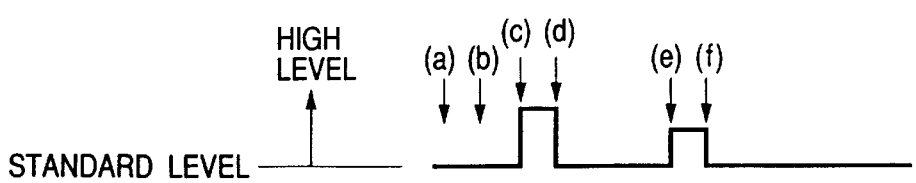
Figure 12:
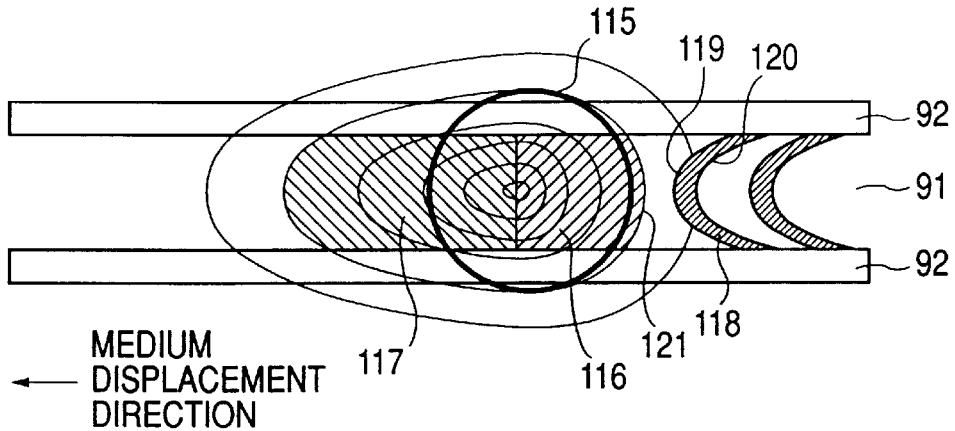
FIG. 12 is a diagram descriptive of a condition where recording magnetic domains are recorded in shapes of feathers of arrows on a land.
Figure 16A:
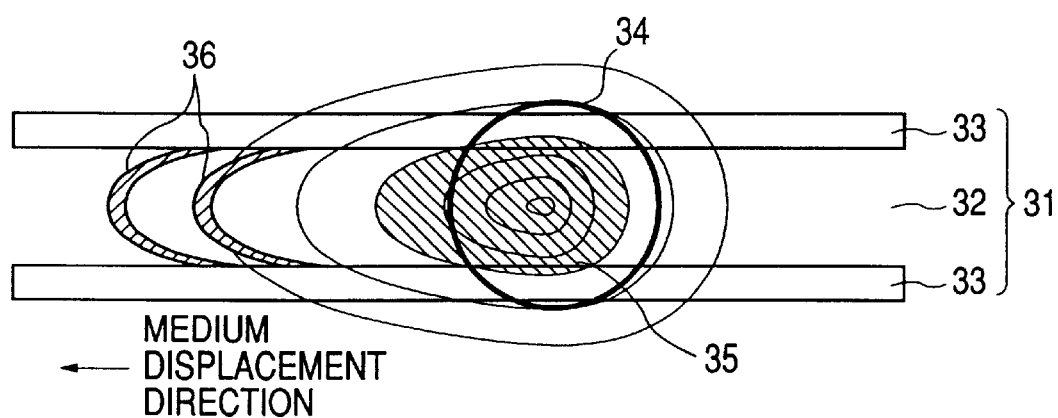
FIGS. 16A and 16B are diagrams showing relationship between a temperature distribution produced by a light spot and magnetic domains having shapes of feathers of arrows on a magneto-optical disk in the first embodiment.
Figure 16B:
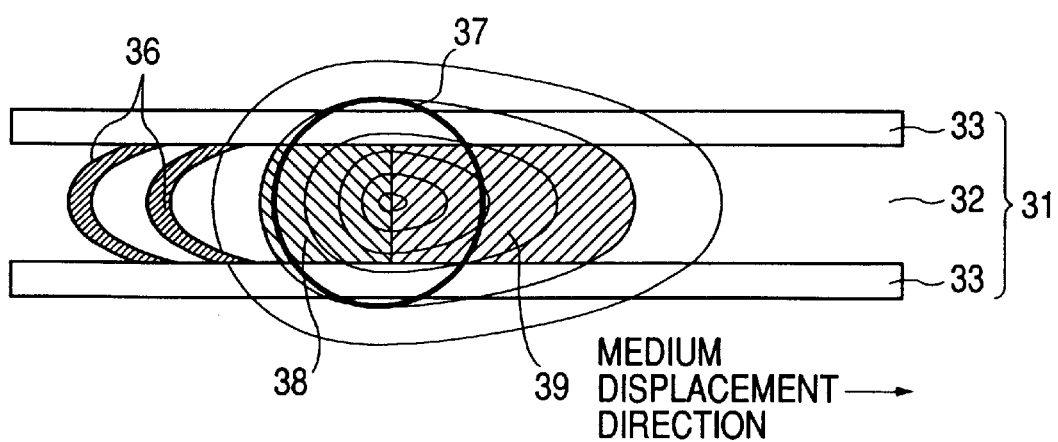

Then, description will be made of concrete operations of the embodiment. FIGS. 16A and 16B show relationship between a shape of a heat distribution on the magneto-optical disk 228 produced by the light spot and a shape of the recording magnetic domain having the shape of the feather of an arrow. FIG. 16A shows the relationship at a recording time, whereas FIG. 16B shows the relationship at a reproduction time. First, it is assumed in FIG. 16A that the disk 228 rotates counterclockwise to record the sequential information. In a condition where the disk 228 is rotating as assumed above, the recording light spot 34 projected from the optical head 62 in FIG. 5 scans the information track 31 consisting of a land 32 and a groove 33. At this time, a magnetic field which is modulated corresponding to information to be recorded from the magnetic head 63 is applied to a location to be projected from a light spot of the disk 228 and a magnetic domain having a shape of the feather of an arrow is formed on the land 32. Since the groove 33 of the disk 28 is not annealed as described with reference to FIG. 9B, an arc in the shape of the feather of an arrow has high curvature. A reference numeral 35 represents a high temperature area.

At a sequential information reproduction time, on the other hand, a spindle motor controller 68 of the magneto-optical memory 219 is controlled by the CPU 3 so that a spindle motor 60 is rotated in a direction reverse to that at the recording time, whereby the disk 228 is rotated in a direction reverse to that at the recording time. The disk 228 is rotated clockwise in FIG. 16B. In this condition, a reproducing light spot 37 projected from the optical head 62 scans the land 32. At this time, the magnetic domain displacement reproducing method using a single beam is selected for information reproduction, whereby a pre-area 38 and a post-area 39 are formed on the disk as shown in FIG. 16B.

Since the rotating direction of the disk 228 is reversed for reproduction in this embodiment, the shape of border to start displacement of the domain wall of the pre-area 38 and the arc shape of the magnetic domain 36 are curved in the same direction and have shapes which are relatively matched with each other, the domain wall displaces smoothly in the pre-area 38. Since a shape of a border to start displacement of the domain wall and the arc shape of the magnetic domain 36 are curved in directions reverse to each other in the post-area 39 where a force to cause the displacement of the domain wall is originally weak as apparent from FIG. 16B, on the other hand, displacement of the domain wall by single domain does not occur in the post-area 39. That is, the rotation of the disk 228 in the reverse direction at the reproduction time makes it possible to reproduce the displacement of the domain wall by single beam without using a reproducing magnetic field even when recording medium in domain wall displacement reproduction system is not annealed. Though it is generally difficult to configure a magnetic head so as to cope with rotations in two directions, this embodiment which requires no reproducing magnetic field at the reproduction time where the disk is rotated in the reverse direction saves the magnetic head 63 to a location where its rotation is not influenced. Accordingly, this embodiment does not allow the magnetic head 63 to be brought into contact with the disk 228 which is rotating reversely, thereby being capable of preventing the disk from being injured.

Figure 17:
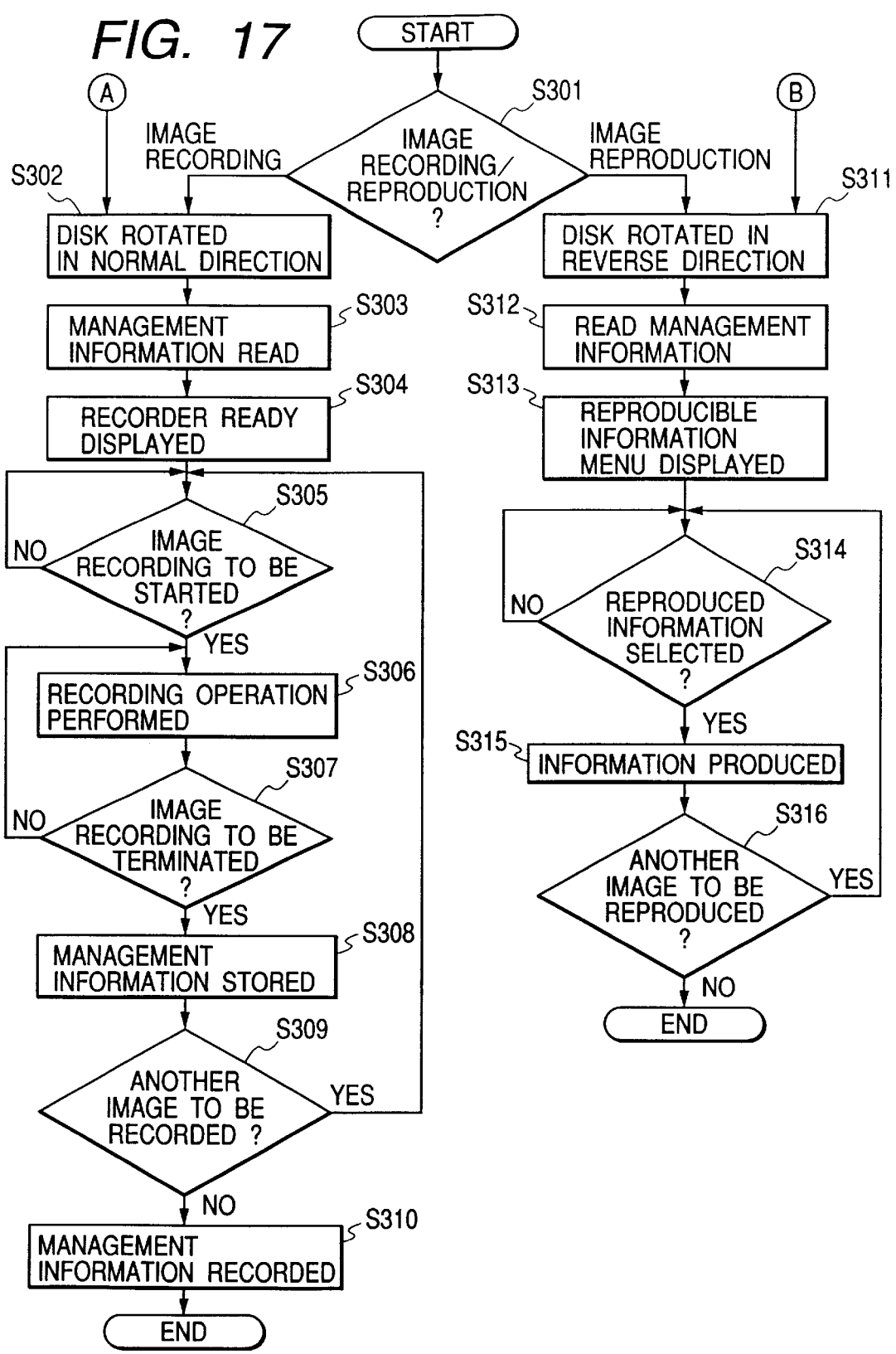
FIG. 17 is a flowchart descriptive of procedures to record and reproduce information in the first embodiment.

Then, description will be made of procedures to record and reproduce information with reference to a flowchart shown in FIG. 17. In FIG. 17, the user first turns on a power source for the disk cam coder 201 and selects whether image information as sequential information is to be recorded or reproduced by manipulating the switches and the like on the input device 215 (S301). When contents which are selected on the basis of the selection information from the input device 215 are image recording operations, the CPU 203 rotates the magneto-optical disk 228 in the recording direction shown in FIG. 16A by controlling the magneto-optical memory 219 (S302). This rotating direction is referred as a normal direction.

When the disk 228 rotates at a predetermined rotating frequency, the CPU 203 controls the magneto-optical memory 219 so that management information consisting of a file name, a recording location and a size of information recorded in the disk 228, a condition of the disk and the like (a directory used for file management) is reproduced (S303) and stored into the internal memory 204. The management information is read out only at an initial stage of the image recording operations. Furthermore, the management information is recorded at a predetermined location of the disk 228 at a line density different from that of the sequential information. That is, the management information is recorded at a rough line density which permits reproduction by the ordinary reproducing method so that the management information which is to be reproduced at both the recording time and the reproduction time can be reproduced by rotating the disk 228 in both the normal and reverse directions.

When the management information is read out and indicates an empty area for image recording exists on the disk 228, the CPU 203 displays a recordable condition on the output device 216 (S304) to display the condition to the user. At this step, a time available for recording, etc. may be displayed. Then, an image recording operation from the user is delayed (S305) and an image recording instruction from the input device 215 is received, the disk cam coder 201 performs a series of image recording operations (S306). Speaking concretely, the disk cam coder 201 receives image information and voice information from the image input section 206 and the microphone 211 by way of the image input controller 205 and the voice input controller 210, contracts the information with the image information contracting-expanding circuit 209 and the voice information contracting-expanding circuit 212, and consecutively accumulates the information into the semiconductor memory 218.

Successively, the disk cam coder 201 transfers information per predetermined unit from the semiconductor memory 218 to the magneto-optical memory 219 and records the information per the predetermined unit on the magneto-optical disk 228 as digital information (concrete recording on the magneto-optical disk 228 will be described later). Image information and voice information which are input from outside is recorded similarly. These operations terminate when an instruction to terminate the image recording operations is received from the user at S307 or when a rest area on the disk 228 is narrower than a definite area. Upon termination of the recording, the disk cam coder 201 stores the management information for managing the recorded information including location information on the disk 228 as new management information into the internal memory 204 (S308) and waits for a next instruction which indicates whether or not another image is to be recorded (S309).

When the disk can coder 201 receives an instruction to record another image, it performs processings similar to those at S305 and later steps. When another image is not to be recorded or when a rest area of the disk 228 is narrower than the definite area, the disk cam coder 201 records the management information stored in the internal memory 204 onto the disk 228 (S310) and terminates the recording processings. Though the management information is recorded at the final step of the image recording operations, only management information which is newly added may be written or all management information including original information may be newly written. Since the management information is read out also at a reproduction stage, two kinds of management information arranged in both the normal direction and reverse direction may be written at the same time so that the information can be read out even by rotating the disk 228 in the reverse direction.

When the user selects the reproducing operations at S301, on the other hand, the CPU 3 rotates the magneto-optical disk 228 in the reproducing direction shown in FIG. 16B by controlling the magneto-optical memory 219 (S311). This direction is referred to as a reverse direction since it is reverse to the recording direction. The rotating direction of the disk 228 is changed by controlling the spindle motor controller 68 of the magneto-optical memory 219 similarly to the change at the recording time. When the disk 228 reaches a predetermined rotating frequency, the management information which has already been recorded on the disk 228 is reproduced and stored into the internal memory 4 (S312). Also in this case, the management information is to be read out only at an initial step of the reproducing operations. When the management information is read out and contents of the image information recorded on the disk 228 are known, the CPU 203 displays the contents of the image information as a menu on the output device 216 (S313) to display the menu to the user.

Then, the disk cam coder 201 waits for image information to be selected by the user (S314) and, upon reception of a selection instruction, performs a series of reproducing operations (S315). Speaking concretely, the CPU 203 consecutively reads out selected image information per predetermined unit from the magneto-optical disk 228 by controlling the magneto-optical memory 219, and transfers the information to the image information contracting-expanding circuit 209 and the voice information contracting-expanding circuit 212 to expand the contracted information, and returning to the original image information and voice information. The CPU 203 outputs this information to the output device 216 or the external TV monitor 229 by way of the monitor output circuit 220. This series of operations are continued until the user gives a termination instruction or recorded information is exhausted. Upon completing the reproducing operations, the disk cam coder 201 waits for an instruction to determine whether or not another image information is to be reproduced (S316) and performs the processings at S314 and later steps when another image is to be reproduced or terminates the reproducing operations when another image is not to be reproduced.

Figure 18:
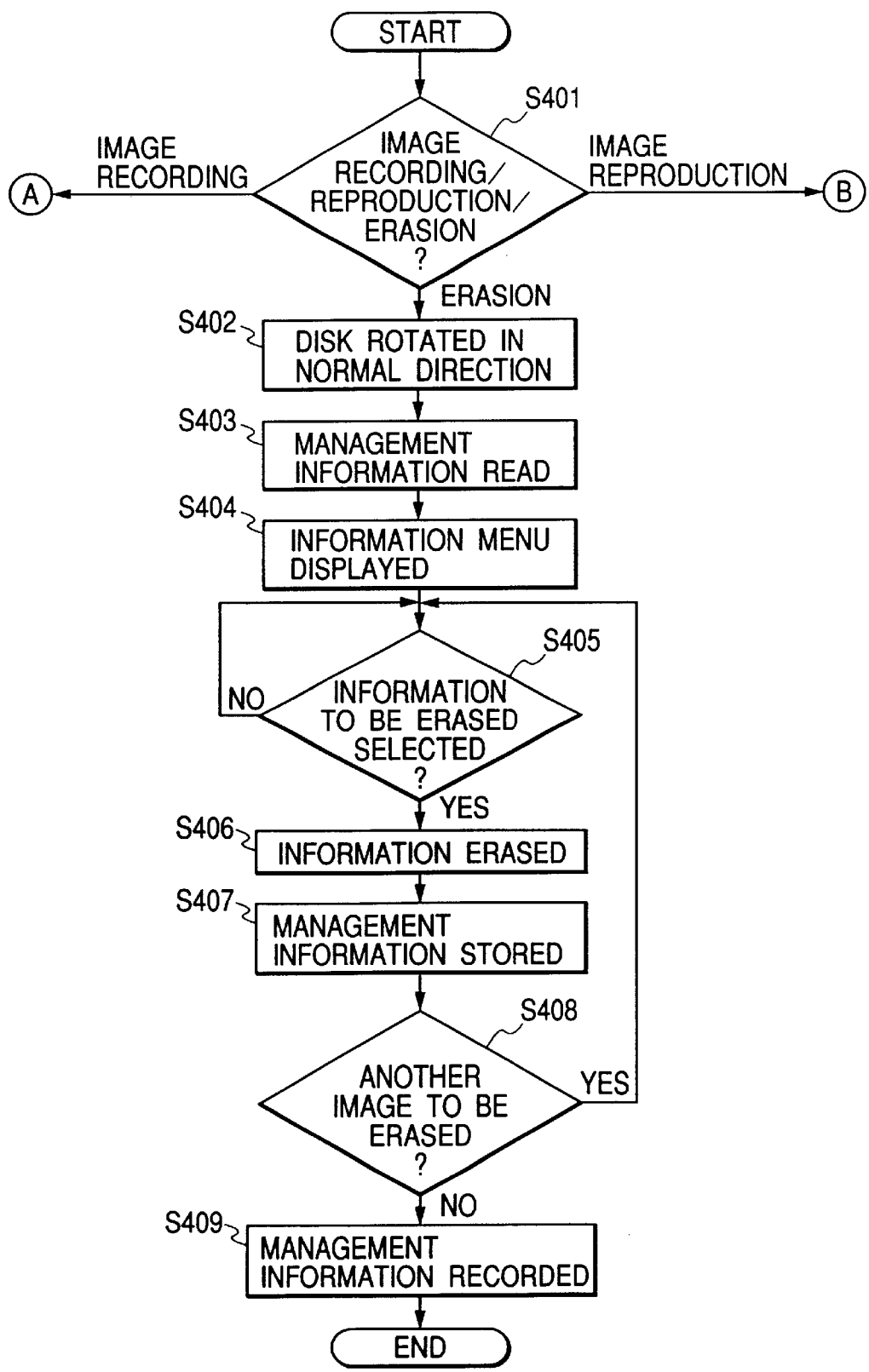
FIG. 18 is a flowchart descriptive of procedures to erase information in the first embodiment.

Now, a description will be made of a method to erase information. Information already recorded on the disk 228 may be erased by writing new information over the information already recorded in the procedures to record an image or separate operations as described with reference to FIG. 18 to prevent the information from being erased by erroneous operations. Information erasing procedures will be described with reference to FIG. 18. In FIG. 18, the disk cam coder 201 first waits for a selection (S401) which is made by the user through operation of the input device 216. To record or reproduce an image, the disk cam coder 203 operates through the process A or B shown in FIG. 17. When the user selects operations to erase image information, the CPU 203 rotates the disk 228 in the normal direction which is the same as that for image recording by controlling the magneto-optical memory 219 (S402). When the disk 228 reaches the predetermined rotating frequency, the CPU 203 reproduces the management information recorded on the disk 228 (S403) and stores it into the internal memory 204. The management information is read out only an initial step of the erasing operations. When the management information is read out and contents of image information recorded on the disk 228 are known, the CPU 203 displays the contents of the image information as a menu on the output device 216 (S204) or the external TV monitor 229 by the monitor output circuit 220.

Then, the disk cam coder 201 waits for a user's instruction which selects image information to be erased (S405) and, upon reception of an erasing instruction, it performs a series of erasing operations (S406). Describing concretely, the disk cam coder 201 records magnetic domains in a definite direction and resets them in initial conditions by scanning a track at a location at which the selected image information is recorded on the disk 228 with a light spot projected from the optical head 62 and applying a magnetic field in a definite direction from the magnetic head 63. At this stage, it is desirable to erase the information with a power higher than a recording power of the light spot used for recording so as not to allow the information to remain unerased as is problematic for the magnetic field modulation recording method. An erasing power higher than a recording power makes it possible to prevent reproduced signals from being deteriorated by information which remains unerased. Upon completing this series of erasing operations, the CPU 203 stores management information indicating the on into the internal memory 204 (S407). Then, the disk cam coder 201 waits for a user's instruction which determines whether or not another image is to be erased (S408). When another image is to be erased, the disk cam coder 201 similarly performs the erasing operations at S405 and later steps. When another image is not to be erased, it terminates the erasing operations by recording management information recorded in the internal memory 4 through steps similar to those for image recording (S409).

Figure 19:
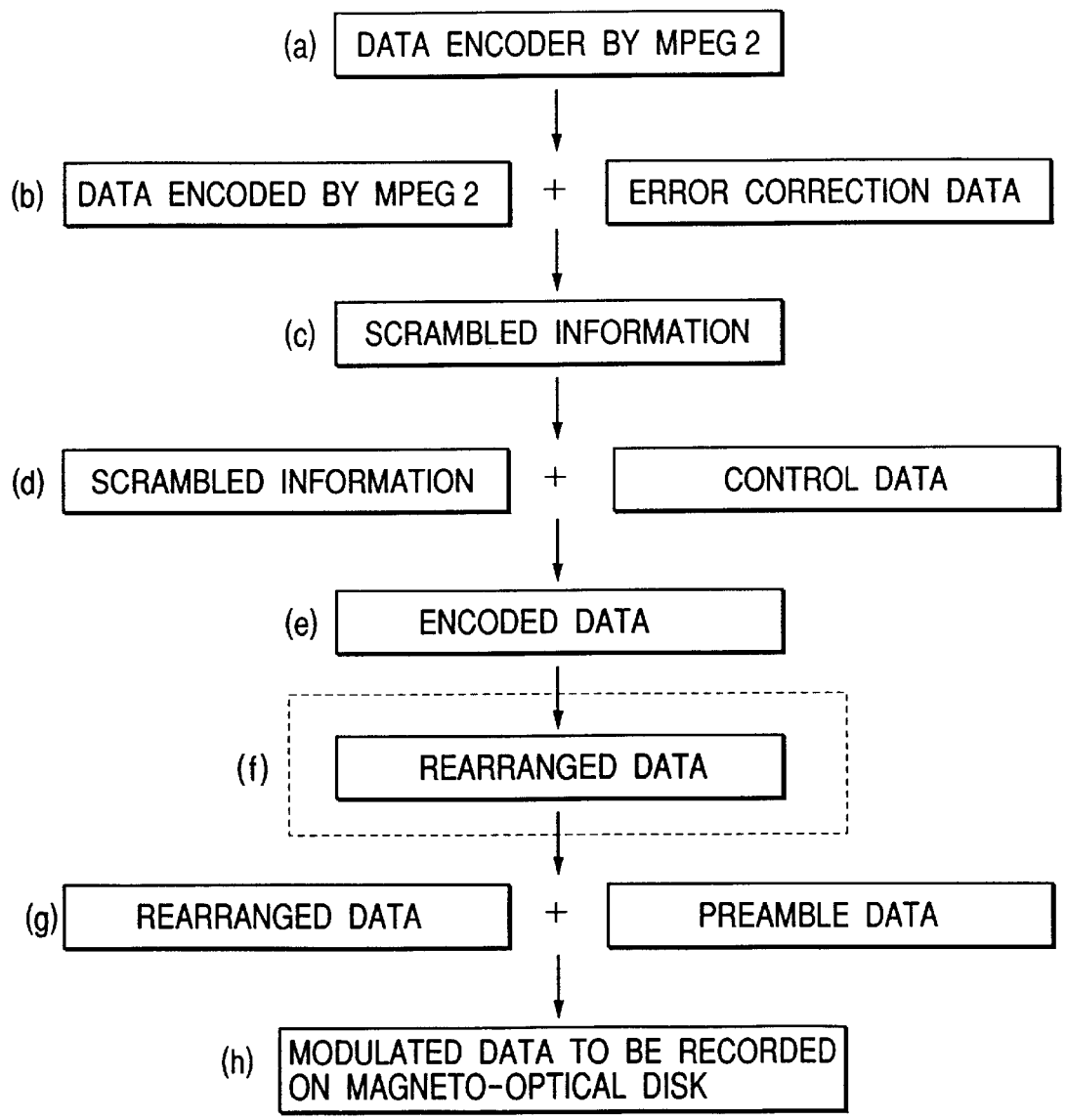
FIG. 19 is a diagram descriptive of a processing sequence to reproduce image data in the first embodiment.

Then, description will be made of data processing steps to record and reproduce sequential data on the magneto-optical disk 228. FIG. 19 shows processing steps to record data. Image data is to be recorded in this embodiment. In FIG. 19, a reference symbol (a) represents digital information which is compressed by a compressing method MPEG2 and sectioned into predetermined unit amounts. Information for error correction is added to each unit as shown in (b) and scrambled as shown in (c) to prevent the data from being a remarkable burst signals due to a defect of medium information. Then, control information such as a track No. and a sector No. on the magneto-optical disk 228 is added as shown in (d) and the image data is subsequently made into codes matched with the magneto-optical disk 228 as shown in (e). In this embodiment, the data is arranged reversely per predetermined unit as shown in (f) so that it can be reproduced by rotating the disk 228 in the reverse direction. The operation in (f) may be performed at a reproduction stage.

Then, preamble data which is used to create a sampling clock is added as shown in (g) after the data arranged reversely (f) or coded data (e) and the image data is modulated according to information signals as shown in (h), thereby creating modulated data (recording signals) to be supplied to the magnetic head 63 at a stage to record the data actually on the magneto-optical disk 228. In this case, it is desirable that the predetermine unit amount of the recording data is smaller than a capacity of an innermost track on the magneto-optical disk 228. Such a unit amount prevents a track from being jumped over even when the disk 228 is rotated in the directions reverse to each other for recording and reproduction, thereby enabling to shorten recording and reproducing times.

Figure 20:
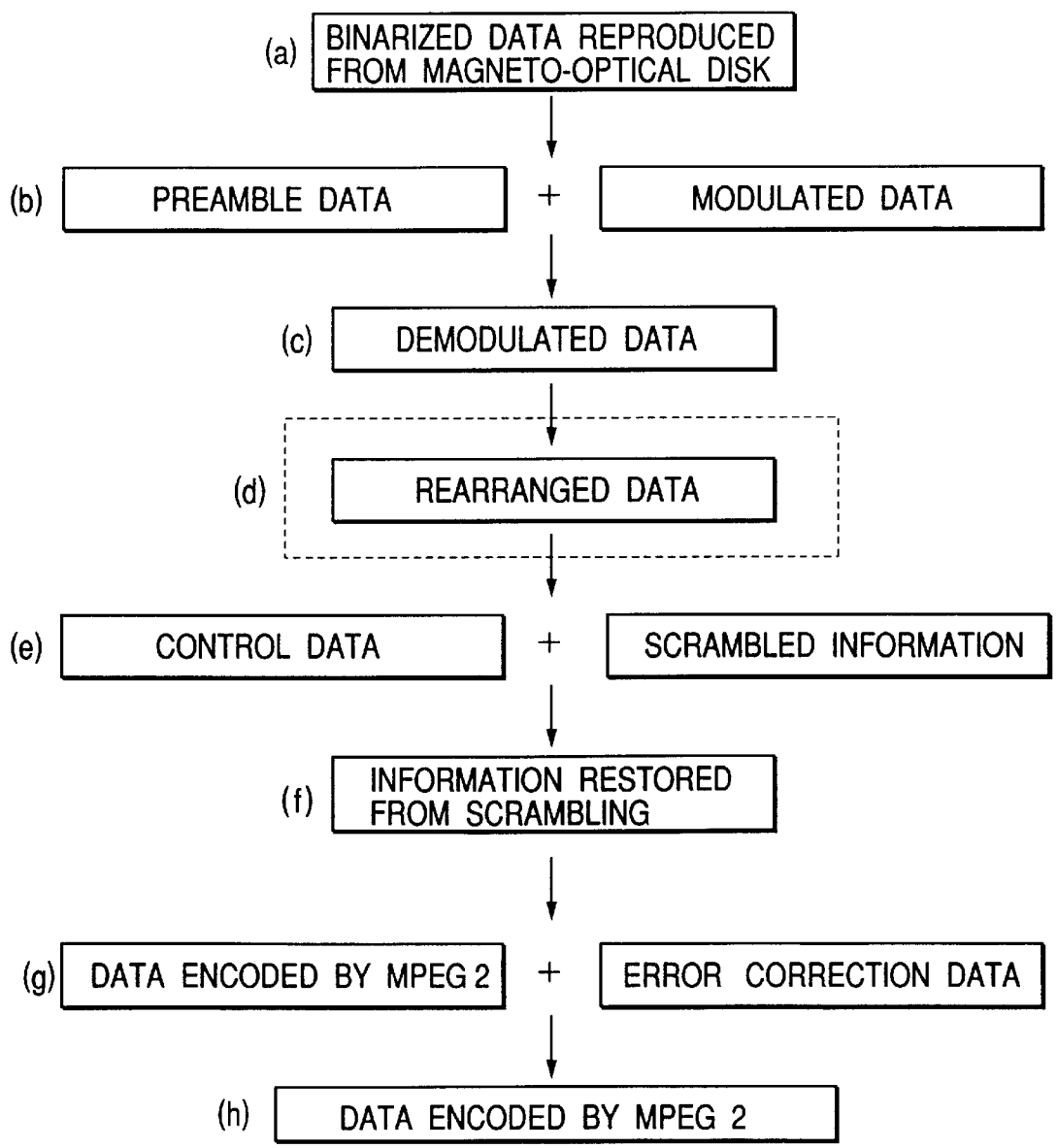
FIG. 20 is a diagram descriptive of a processing sequence to reproduce image data in the first embodiment.

FIG. 20 shows steps to reproduce image data which is processed and recorded on the magneto-optical disk 228 through the steps shown in FIG. 19. In FIG. 20, signals reproduced from the magneto-optical disk 228 are binarized as shown in (a). Then, the binarized data is separated into preamble data for creating a sampling clock and modulated data as shown in (b), and a sampling clock is created on the basis of the preamble data as shown in (b). Then, the data is demodulated using a positively isomerized sampling clock as shown in (c). Since the disk 228 is rotated for reproduction in the direction reverse to that for recording, the data is processed as it is when the data is arranged reversely at the recording stage or the data is arranged reversely per predetermined unit amount as shown in (d) when the data is not arranged reversely.

Further, control information is separated as shown in (e) from the data which is not arranged reversely (c) or the data which is arranged reversely (d), the data is made free from the scrambling as shown in (f) and error correcting processing is performed shown in (g), whereby data encoded by MPEG2 is obtained as shown in (h). The data processings shown in FIG. 19 for example step (a) are performed, by the image information contracting-expanding circuit 209, whereas steps (b) through (h) are performed by the magneto-optical memory 219. Out of the data processings shown in FIG. 20, for example (a) through (g) are performed by the magneto-optical memory 219, whereas (h) is performed by the image information contracting-expanding circuit 209.

Figure 21A:
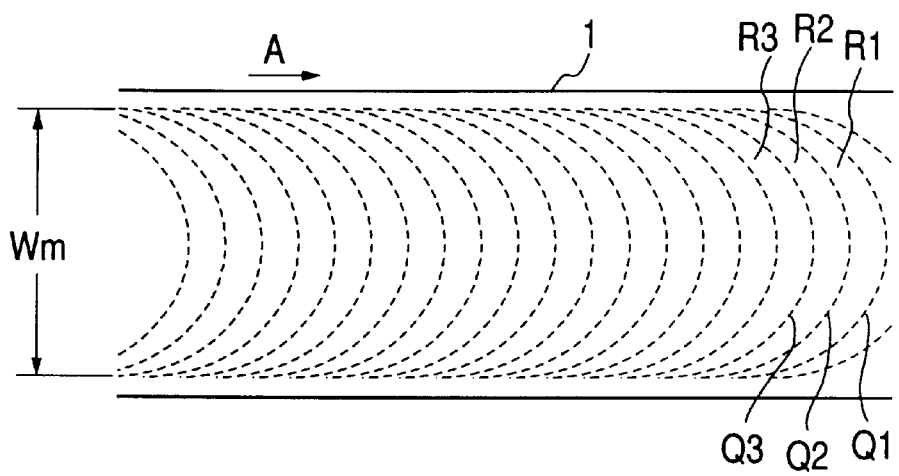
FIGS. 21A and 21B are diagrams descriptive of a second embodiment of the information reproducing method according to the present invention.
Figure 21B:
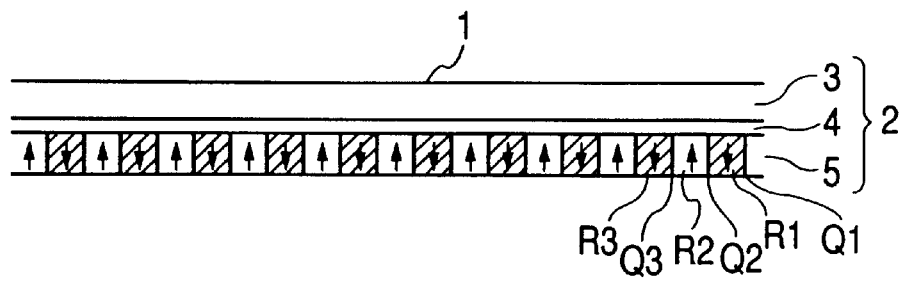

Now, description will be made of a second embodiment of the present invention. FIGS. 21A and 21B are partial enlarged views of a magneto-optical medium 1 used in the present embodiment. FIG. 21A is a top view and FIG. 21B is a sectional view. The magneto-optical medium 1 consists of a substrate (not shown) and a magnetic layer 2 disposed on the substrate. The magnetic layer 2 is composed of three layers, that is, a memory layer 5 made of TbFeCo, a switching layer 6 made of GdFe and a displacement layer 3 made of GdFeCo.

The memory layer 5 is a perpendicular magnetization film which is made of a material having a low degree of displacement of domain wall and a high domain wall coercivity. The switching layer 6 is a internal magnetization film at a temperature not exceeding T1 but is a perpendicular magnetization film at a temperature higher than T1 and has a Curie temperature of T2. Furthermore, the displacement layer 3 is an internal magnetization film at a temperature not exceeding T1, but a perpendicular magnetization film which has a high degree of displacement of domain wall and a low domain wall coercivity and has a Curie temperature higher than T2. Arc-like magnetized areas R1, R2, R3, . . . which are magnetized upward and downward are formed alternately in a row on the memory layer 5 as shown in FIGS. 21A and 21B. The magnetized areas R1, R2, R3, . . . have a width Wm, for example, of 0.6 μm. Furthermore, arc-like domain walls Q1, Q2, Q3, . . . all of which are curved in the same direction are formed on borders at front ends and rear ends of the magnetized areas R1, R2, R3, . . . FIG. 21A is a view as seen from the displacement layer 3 and shows the domain walls Q1, Q2, Q3, . . . formed on the memory layer 5 in dashed lines.

The row of the magnetized areas R1, R2, R3, . . . accompanied by the arc-like domain walls Q1, Q2, Q3, . . . which are curved in the same direction is formed by a recording method (magnetic field modulation recording method) which displaces the magneto-optical medium 1 relative to a recording light beam while irradiating the memory layer 2 with the recording light beam condensed to a fine light spot and simultaneously applying a magnetic field which varies in a vertical direction correspondingly to information signals to be recorded at a location irradiated with the recording light beam.

Then, description will be made of a magnetic domain magnification reproducing method according to the present embodiment with reference to FIGS. 22A through 22F. To detect the magnetized areas, the magneto-optical medium 1 is displaced relative to a reproducing light beam while irradiating the magnetic layer 2 of the magneto-optical medium 1 with the reproducing light beam condensed to a fine light spot. FIGS. 22A through 22F sequentially show status changes which occur on the magnetic layer 2 as time elapses. An arrow A in FIG. 22A indicates a displacement direction of the magneto-optical medium 1 which is the same as the displacement direction (indicated by the arrow A in FIG. 21A) for recording information signals.

When the magnetic layer 2 is irradiated with the reproducing light beam, it is partially heated. In FIGS. 22A through 22F, a reference numeral 7 represents an isothermal line of T1 which is formed by the heating and a reference numeral 8 designates an isothermal line of T2 which is higher than T1. In an area outside the isothermal line 7, temperature is lower than T1, and the switching layer 6 and the displacement layer 3 are internal magnetization films. An area in a shape of a circle or an elongated circle (elliptic or oval shape) is a transfer area 9 in which temperature is higher than T1 and the displacement layer 3 is a perpendicular magnetization film. In area on the switching layer 6 which is located between the isothermal line 7 and the isothermal line 8, temperature is higher than T1 and lower than T2, whereby the switching layer 6 is a perpendicular magnetization film. In an area enclosed by the isothermal line 8 where temperature is higher than T2, the switching layer 6 is demagnetized. Both the displacement layer 3 and the switching layer 6 are perpendicular magnetization films and in exchange coupling with the memory layer 5 in the area located between the isothermal line 7 and the isothermal line 8, whereas the displacement layer 3 is a perpendicular magnetization film but not in exchange coupling with the memory layer 5 due to demagnetization of the switching layer 6 in the area enclosed by the isothermal line 8. Furthermore, transfer area has a width W1 of 0.5 μm, and the area enclosed by the isothermal line 8 has a width W2 which is smaller than W1 and is larger than W1 ×0.6, for example 0.4 μm.

Figure 22A:
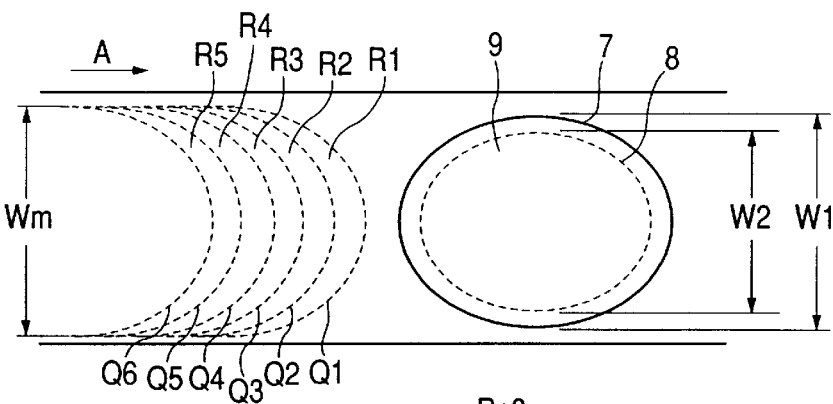
FIGS. 22A, 22B, 22C, 22D, 22E and 22F are diagrams descriptive of a method to magnify and reproduce magnetic domains in the second embodiment.

FIG. 22A shows a condition immediately before reproducing operations, where the magnetized areas R1, R2, R3, . . . formed on the memory layer 5 are not located right under transfer area 9 formed on the displacement layer 3 and the memory layer 5 right under the transfer area 9 is magnetized upward. As a result of exchange coupling with the memory layer 5, magnetization of the memory layer 5 is transferred to the transfer area 9, whereby the transfer area 9 is magnetized upward. Though a portion of the transfer area 9 which is enclosed by the isothermal line 8 is not in exchange coupling with the memory layer 5 no cause is constituted to magnetize the transfer area 9 and it is magnetized upward by exchange coupling with its surroundings following the upward magnetization transferred to the transfer area 9.

Figure 22B:
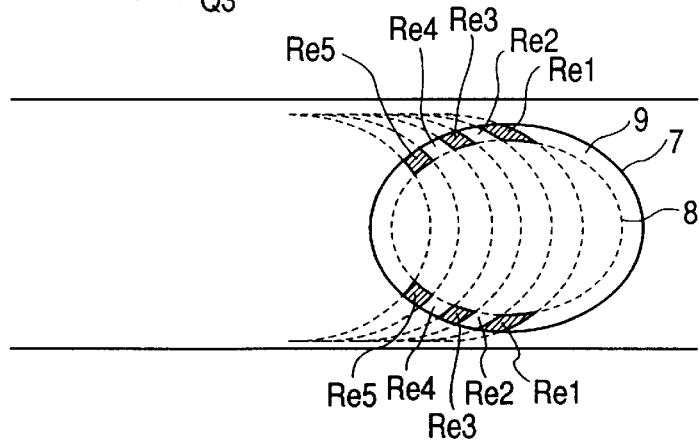
Figure 22C:
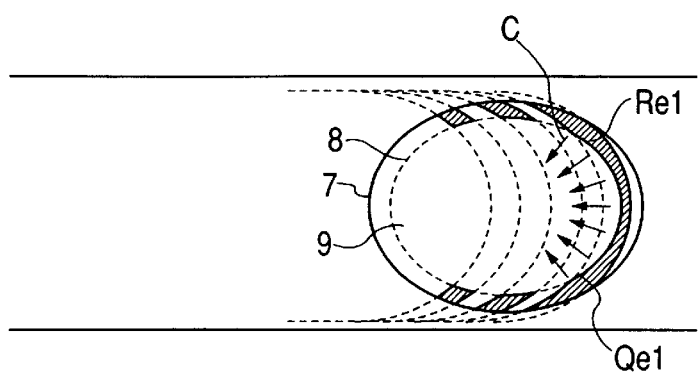
Figure 22D:
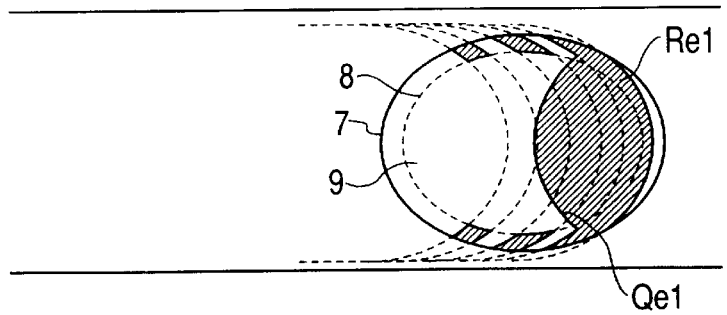

When the magneto-optical medium 1 displaces as time elapses, a portion of the magnetized areas R1, R2, R3, . . . formed on the memory layer 5 as shown in FIG. 22B is partially located right under the transfer area 9 from a front end (left side in FIGS. 22A through 22F) of the transfer area 9. Though the portion of the magnetized areas R1, R2, R3, . . . is transferred to the transfer area 9 by way of the switching layer 6, the portion of the transfer area 9 which is enclosed by the isothermal line 8 is not transferred since it is no in exchange coupling with the memory layer 5. Accordingly, fine magnetized areas Re1, Re2, Re3, ... each of which is divided into two are transferred and formed on portions of the transfer area 9 which are located outside the isothermal line 8 in the transfer area 9 as shown in FIG. 22B. The magnetized areas Re1, Re2, Re3, ... which are to be transferred and formed are remarkably small when the isothermal line 8 is sufficiently close to the isothermal line 7. In some cases, the magnetized areas Re1, Re2, Re3, ... shown in FIG. 22 may not have a size large enough for stable existence, thereby not being transferred and formed. The magnetized areas Re1, Re2, Re3, ... produce little influence on signal detection so far as they are sufficiently small. It is therefore preferable that the width W2 of the portion enclosed by the isothermal line 8 is smaller than the width W1 of the transfer area and larger than W1×0.6.

When the magneto-optical medium 1 further displaces until a front end (right side in FIGS. 22A through 22F) of the magnetized area Re1 which is formed on the memory layer 5 and magnetized downward goes beyond a rear end (right end in FIGS. 22A through 22F) of the isothermal line 8 and near a rear edge (right side in FIGS. 22A through 22F) of the transfer area 9, the two divided magnetized areas Re1 is integrated with each other into a crescent shape. An integrated magnetized area Re1 is transferred and formed at this stage even when the magnetized areas Re1 cannot exist stably, are not transferred and formed in the preceding condition shown in FIG. 22B. Furthermore, the domain wall Qe1 is transferred and formed together with the magnetized area Re1. At least a portion of the domain wall Qe1 is transferred and formed at an edge of an area at which the displacement layer 3 is not in exchange coupling with the memory layer 5, i.e., on the isothermal line 8, and curved in the same direction as the rear edge of the transfer area 9.

Driving forces directed toward high temperature as indicated by an arrow C, that is, directed toward center of the transfer area 9 are exerted to portions of the domain wall Qe1 which is transferred and formed on the transfer area 9. The domain wall Qe1 is not restricted and movable since the transfer area 9 has a high degree of displacement of domain wall and a low domain wall coercivity, and the displacement layer 3 is not in exchange coupling with the memory layer 5 in the area enclosed by the isothermal line 8. Accordingly, the domain wall Qe1 moves toward a center of the transfer area 9 in the area enclosed by the isothermal line 8, whereby the transferred magnetized area re1 is magnified in the transfer area 9. The driving forces exerted to move the domain wall Qe1 are in directions nearly perpendicular to the isothermal line 8 at both ends of the domain wall Qe1 which is close to the isothermal line 8. Accordingly, portions of the domain wall Qe1 which are nearer its ends move for shorter distances and middle portions of the domain wall Qe1 move for longer distances toward the center of the transfer area 9, whereby the domain wall Qe1 is deformed and curved in a direction reverse to the direction before the displacement.

Figure 22E:
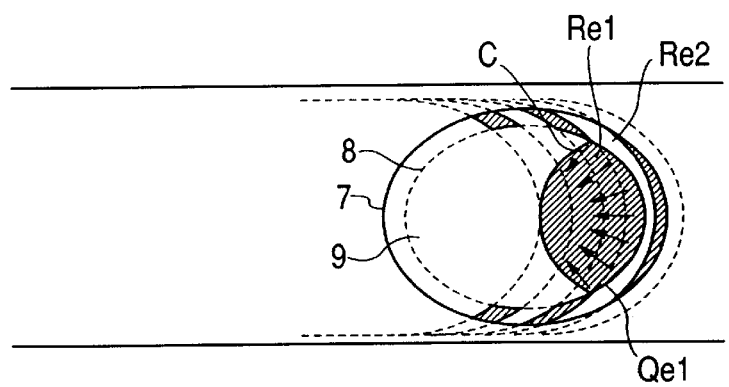
Figure 22F:
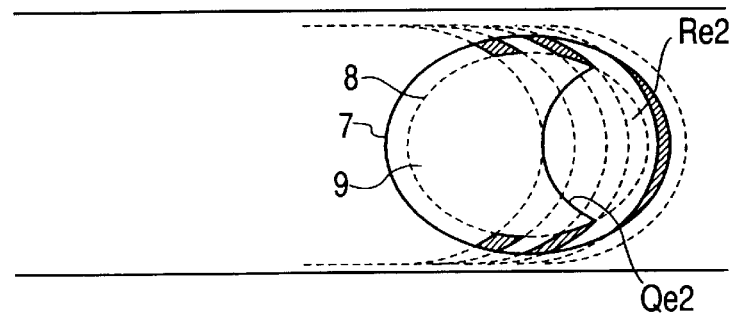

When the magneto-optical madam 1 displaces with further time lapse until a front end of the subsequent magnetized area R2 which is formed on the memory layer 5 and magnetized upward goes beyond the rear end of the isothermal line 8 and near the rear edge of the transfer area 9 as shown in FIG. 22E, the magnetized area Re2 having the crescent shape is transferred and formed together with the domain wall Qe2. At least a portion of the domain wall Qe2 is transferred and formed on an edge of the area where the displacement layer 3 is not in exchange coupling with the memory layer 5, i.e., on the isothermal line 8, and curved in the same direction as the rear edge of the transfer area 9. Driving forces directed toward high temperature, i.e., toward the center of the transfer area as indicated by arrows C are exerted to portions of the transferred and formed domain wall Qe2. Accordingly, domain wall Qe2 moves toward the center of transfer area 9 similar to domain wall Qe1 the magnetized area Re2 which is transferred and magnetized upward is magnified in the transfer area 9 as shown in FIG. 22F. Simultaneously, the magnetized area Re1 which is magnified before is contracted and disappeared.

When a front portion (left side portion in FIGS. 22A through 22F) of the transfer area 9 is magnetized upward, the magnetized area Re2 which is magnetized also upward is integrated with a front portion of the transfer area 9 as a result of the magnification, whereby the domain wall Qe2 is disappeared actually immediately after it is moved to a location shown in FIGS. 22A through 22F.

Each time portions of the magnetized are R3, R4, R5, ... formed on the memory layer 5 pass through the rear end of the isothermal line 8, domain walls which are transferred and formed in the transfer area 9 move by repeating operations shown in FIG. 22B to FIG. 22F, and the magnetized areas which a magnetized upward and downward are magnified alternately. However, domain walls formed on the memory layer 5 do not move since the memory layer 5 has a low degree of displacement of domain wall and the high domain wall coercivity. The magnified magnetized area can be detected with reflected rays of the reproducing light beam utilizing the magneto-optical effect. Since detection signal levels can be enhanced by magnifying the magnetized area, the second embodiment is capable of detecting signals, like the first embodiment, even when lengths of magnetized areas formed on the memory layer 5 are shorter than a diameter of the reproducing light beam.

For easy understanding of the second embodiment, a condition immediately before starting the signal reproducing operations is taken as that shown in FIG. 22A where the magnetized areas formed on the memory layer 5 are not located right under transfer area 9 of the displacement layer 3 and the transfer area 9 is magnetized as a whole in a definite direction. However, it is not always necessary to magnetize the memory layer 5 in the condition shown in FIG. 22A immediately before the reproducing operations and operations shown in FIGS. 22B through 22F are repeated by starting the reproducing operation regardless of a magnetized condition of the memory layer 5. For a short time after the magnetized area formed on the memory layer 5 is located right under the transfer area 9 from forward (leftward in FIGS. 22A through 22F) the transfer area 9 until the magnetized area reaches the front end (left end in FIGS. 22A through 22F) of the isothermal line 8, a magnetized area is transferred and formed at a location close to a front side (left side in FIGS. 22A through 22F) due to exchange coupling with the memory layer 5 and a curved main wall is also transferred and formed. However, the domain wall which is transferred and formed at this stage is curved in a direction reverse to the front edge of the transfer area 9. For a reason similar to that described with reference to the prior art, the domain wall which is transferred and formed on the front side of the transfer area 9 cannot move and the magnetized and cannot be magnified so far as a magnetic field is not applied. Accordingly, signal reproduction is not influenced even if a magnetized area is transferred and formed on the front side of the transfer area 9.

Though both the ends of the domain wall transferred and formed on the transfer area 9 moves for the short distance in a direction along the edge of the transfer area 9, the second embodiment magnifies the transferred and formed magnetized area by deforming it so as to be curved in the reverse direction. Moreover, the second embodiment does not always require prolonging the domain a wall to magnify the transferred and formed magnetized area as understood from FIGS. 22A through 22F and is capable of magnifying the transferred and formed magnetized area when a length of the domain wall remains substantially unchanged from the before the displacement or even when the length is shortened. Accordingly, the second embodiment does not require remarkable increase in energy, thereby making it unnecessary to apply a magnetic field in a magnetize direction of the magnetized area.

A high temperature gradient from the edge of the transfer area 9 toward its center is desirable since a higher temperature gradient curves the transferred and formed domain wall in the reverse direction at a higher curvature, magnifies the transferred magnetized area so as to have a larger area and enhances detection signal levels. Even when a temperature gradient is not so high as to curve a domain wall in the reverse direction and the domain wall is deformed nearly linearly, however, the second embodiment magnifies the magnetized area so as to enlarge, thereby exhibiting an effect to enhance detection signal levels. Though the magnetic layer 2 is heated to form the transfer area on the displacement layer by irradiating the magnetic layer 2 of the magneto-optical medium 1 with reproducing optical beams in the second embodiment, it is possible to form the transfer area 9 on the displacement layer 3 by heating means which displaces relative to the magneto-optical medium 1, for example by irradiating the magnetic layer 2 with a heating light beam.

To facilitate displacement of the transferred and formed magnetized area and magnify the magnetized area in the second embodiment, it is desirable that curved shapes of the domain walls Q1, Q2, Q3, . . . on the borders of the magnetized areas R1, R2, R3, . . . formed on the memory layer 5 are nearly the same as that of the rear side (right side in FIGS. 22A through 22F) of the isothermal line 8. For this purpose, it is most desirable that the width W22 of the area enclosed by the isothermal line 8 is nearly the same as the width Wm of the magnetized areas RI, R2, R3, . . . formed on the recording layer 5, but the second embodiment can exhibit its effect so far as W2 is within a range where it is larger than Wm×0.6 and smaller than Wm×1.5. Since a size of the area enclosed by the isothermal line 8 is nearly proportional to an irradiating intensity of the reproducing light beam or the heating light beam to form it, the width W2 of the area enclosed by the isothermal line 8 can be made adequate by adequately setting an irradiating intensity of the reproducing light beam or the heating light beam.

What is claimed is:

1. A method for reproducing information from a magneto-optical medium which comprises a memory layer comprised of a magnetic film and a displacement layer comprised of a magnetic film laminated with said memory layer, wherein information signals are recorded on magnetized areas on said memory layer in a predetermined direction and domain walls having arc shapes curved in the same direction are formed on borders of the magnetized areas, said method comprising the steps of:

forming a high temperature area having a shape of a circle or an elongated circle in said medium by scanning the magnetized areas on said memory layer with a light spot in a direction toward convexities of said arc shapes of the magnetized areas;

displacing a domain wall of the magnetized area transferred to the displacement layer toward a center of the high temperature area to magnify the magnetized area when the domain wall comes into the high temperature area; and reproducing information by detecting reflected rays of the light spot in a condition where the magnetized area transferred to the displacement layer is magnified.

2. A method for reproducing information from a magneto-optical medium which comprises a memory layer comprised of a magnetic film and a displacement layer comprised of a magnetic film laminated with said memory layer, wherein information signals are recorded on magnetized areas on said memory layer in a predetermined direction and domain walls having arc shapes curved in the same direction are formed on borders of the magnetized areas, said method comprising the steps of:

forming in said medium a first temperature area having a shape of a circle or an elongated circle where the temperature is higher than that in an area not irradiated with a light spot, and a second ring-like temperature area which is located around said first temperature area, and in which the temperature is higher than that in the area not irradiated with the light spot and lower than that in the first temperature area by scanning the magnetized areas in said memory layer with a light spot in a direction toward concavities of said arc shapes of the magnetized areas;

transferring a magnetized area in the memory layer to the displacement layer in the second temperature area without transferring the magnetized area in the memory layer to the displacement layer in the first temperature area in accordance with said scanning with the light spot;

displacing a domain wall at a front end of the arc-like magnetized area transferred to the displacement layer toward a center of the first temperature area to magnify the magnetized area when a rear end of the first temperature area reaches a domain wall at a front end of one of the magnetized areas in accordance with said scanning with the light spot; and reproducing information by detecting reflected rays of the light spot in a condition where the magnetized area transferred to the displacement layer is magnified.

3. A method for recording and reproducing information on and from a magneto-optical medium which comprises a memory layer comprised of a magnetic film and a displacement layer comprised of a magnetic film laminated with said memory layer comprising the steps of:

applying a magnetic field, modulated according to information, at a location of said medium irradiated with a light spot while scanning said medium with the light spot in a first direction, whereby magnetized areas arranged in the first direction are formed and domain walls having arc shapes curved in the first direction are fonned on borders of said magnetized areas to record information;

forming a high temperature area having a shape of a circle or an elongated circle in said medium by scanning the magnetized areas on said memory layer in a second direction that is the reverse of the first direction;

displacing a domain wall of the magnetized area transferred to the displacement layer toward a center of the high temperature area to magnify the magnetized area when the domain wall comes into the high temperature area; and reproducing information by detecting reflected rays of the light spot in a condition where the magnetized area transferred to the displacement layer is magnified.

4. The method for recording and reproducing information according to claim 3, wherein signals of said information are rearranged per predetermined unit to record said information on said medium.

5. The method for recording and reproducing information according to claim 3 further comprising a step of adding to said information preamble information for creating a sampling clock per predetermined unit, to record the information on said medium.

6. The method for recording and reproducing information according to claim 4 or 5, wherein said medium is a disk-like medium on which tracks are formed concentrically or spirally and wherein said predetermined unit consists of an information amount which is smaller than a capacity of an innermost track of said disk-like medium.

7. The method for recording and reproducing information according to claim 3, wherein said information according to which the magnetic field is modulated comprises first information and second information, wherein the second information comprises recording management information, said method further comprising a step of recording the management information for managing information to be recorded on said medium at a line density lower than that of the first information and enabling first information to be reproduced by a method other than a method wherein a domain wall is displaced.

8. The method for recording and reproducing information according to claim 3 further comprising a step of erasing signals of recorded information by scanning said medium with the light spot in the first direction.

* * * * *

UNITED STATES PATENT AND TRADEMARK OFFICE
CERTIFICATE OF CORRECTION

PATENT NO.     : 6,298,015 B1
DATED          : October 2, 2001
INVENTOR(S)    : Kazuyoshi Ishii et al.

It is certified that error appears in the above-identified patent and that said Letters Patent is hereby corrected as shown below:

Title page,
Item [56], References Cited, U.S. PATENT DOCUMENTS,
"Hishi et al." should read -- Hoshi et al. --.

Column 4,
Line 25, "component" should read -- components --.
Line 59, "lead" should read -- led --.

Column 5,
Line 12, "a" should be deleted.

Column 6,
Line 4, "byway" should read -- by way --.

Column 7,
Line 53, "1.3λm" should read -- 1.3 $\mu$m --.

Column 11,
Line 8, "staring" should read -- starting --.
Line 15, "smooth" should read -- smoothly --.

Column 13,
Lines 12 and 20, "comprises" should read -- comprise --.

Column 16,
Line 62, "if" should read -- is --.

Column 17,
Line 14, "wall" should read -- walls --.
Line 58, "o" should read -- of --.

UNITED STATES PATENT AND TRADEMARK OFFICE
CERTIFICATE OF CORRECTION

PATENT NO. : 6,298,015 B1
DATED : October 2, 2001
INVENTOR(S) : Kazuyoshi Ishii et al.

It is certified that error appears in the above-identified patent and that said Letters Patent is hereby corrected as shown below:

Column 19,
Lines 43, 46 and 48, "cam coder" should read -- camcorder --.

Column 20,
Lines 4, 11, 30, 34 and 39, "cam coder" should read -- camcorder --.

Column 21,
Line 61, "cam coder" should read -- camcorder --.

Column 22,
Lines 27, 29, 39, 50, and 60, "cam coder" should read -- camcorder --.
Line 56, can coder" should read -- camcorder --.

Column 23,
Lines 24, 41, 55 and 57, "cam coder" should read -- camcorder --.

Column 24,
Lines 5, 9, 24 and 27, "cam coder" should read -- camcorder --.
Line 23, "on" should read -- erasion --.
Line 42, "burst" should read -- burst of --.
Line 59, "predetermine" should read -- predetermined --.

Column 25,
Line 39, "a" should read -- an --.

Column 27,
Line 1, "no" should read -- not --.
Line 22, "is" should read -- are --.
Line 46, "re1" should read -- Re1 --.
Line 56, "madam" should read -- medium --.

UNITED STATES PATENT AND TRADEMARK OFFICE
CERTIFICATE OF CORRECTION

PATENT NO.   : 6,298,015 B1
DATED        : October 2, 2001
INVENTOR(S)  : Kazuyoshi Ishii et al.

It is certified that error appears in the above-identified patent and that said Letters Patent is hereby corrected as shown below:

Column 28,
Line 5, "Qe1" should read -- Qe1 and --.
Line 17, "are" should read -- areas --.
Line 22, "a" should read -- are --.
Line 61, "magnetized and cannot be magnified so far as" should read -- magnetized area cannot be magnified as long as --.
Line 66, "moves" should read -- move --.

Column 29,
Line 4, "a" should be deleted.
Line 7, "the" should be deleted.
Line 11, "magnetize" should read -- magnetizing --.

Signed and Sealed this

Eighteenth Day of June, 2002

Attest:

JAMES E. ROGAN
Attesting Officer          Director of the United States Patent and Trademark Office